(12) United States Patent
Kim et al.

(10) Patent No.: US 11,296,828 B2
(45) Date of Patent: Apr. 5, 2022

(54) METHOD FOR TRANSMITTING OR RECEIVING FRAME IN WIRELESS LAN, AND DEVICE THEREFOR

(71) Applicant: LG Electronics Inc., Seoul (KR)

(72) Inventors: Jeongki Kim, Seoul (KR); Kiseon Ryu, Seoul (KR); Jinyoung Chun, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/761,116

(22) PCT Filed: Nov. 21, 2018

(86) PCT No.: PCT/KR2018/014347
§ 371 (c)(1),
(2) Date: May 1, 2020

(87) PCT Pub. No.: WO2019/103452
PCT Pub. Date: May 31, 2019

(65) Prior Publication Data
US 2020/0280399 A1 Sep. 3, 2020

Related U.S. Application Data

(60) Provisional application No. 62/607,327, filed on Dec. 19, 2017, provisional application No. 62/588,942, filed on Nov. 21, 2017.

(30) Foreign Application Priority Data

Mar. 23, 2018 (KR) .......................... 10-2018-0034149

(51) Int. Cl.
*H04W 72/12* (2009.01)
*H04L 1/18* (2006.01)
(Continued)

(52) U.S. Cl.
CPC .......... *H04L 1/1819* (2013.01); *H04L 1/0003* (2013.01); *H04L 1/0006* (2013.01); *H04W 84/12* (2013.01)

(58) Field of Classification Search
CPC ... H04L 1/0003; H04L 1/0004; H04L 1/0006; H04L 1/001; H04L 1/08; H04L 1/1819;
(Continued)

(56) References Cited

U.S. PATENT DOCUMENTS 10,985,874 B2 * 4/2021 Latif ................. H04W 72/0466
2009/0040970 A1 * 2/2009 Ahmadi ............... H04B 7/2612
370/329

(Continued)

OTHER PUBLICATIONS

PCT International Search Report in International Application No. PCT/KR2018/014347, dated Mar. 4, 2019, 21 pages (with English translation).

*Primary Examiner* — Phuc H Tran
(74) *Attorney, Agent, or Firm* — Fish & Richardson P.C.

(57) ABSTRACT

A method by which a station (STA) transmits a hybrid automatic repeat request (HARQ) physical layer protocol data unit (PPDU) in a wireless LAN system supporting an HARQ process, according to one embodiment of the present invention, comprises the steps of: generating a HARQ PPDU including allocation information on a HARQ burst, which is unit data to which the HARQ process is applied, and a plurality of HARQ bursts; and transmitting the HARQ PPDU, wherein the HARQ PPDU includes a HARQ signaling (SIG) field of a physical layer for transmitting the allocation information on a HARQ burst, and the allocation information on a HARQ burst can include STA ID for each of the plurality of HARQ bursts, HARQ burst size information, HARQ process channel ID and information indicating, in a toggle manner, whether a transmission is a new transmission or retransmission.

14 Claims, 51 Drawing Sheets

(51) Int. Cl.
*H04L 1/00* (2006.01)
*H04W 84/12* (2009.01)

(58) Field of Classification Search
CPC ............... H04L 1/1822; H04L 1/1864; H04L 2001/0093; H04L 27/26; H04W 84/12
See application file for complete search history.

(56) References Cited

U.S. PATENT DOCUMENTS

| | | |
|---|---|---|
| 2009/0100310 A1 | 4/2009 | Yoo et al. |
| 2011/0113299 A1 | 5/2011 | Power et al. |
| 2011/0126068 A1 | 5/2011 | Lee et al. |
| 2012/0002619 A1* | 1/2012 | Kim ................... H04L 1/1896 370/329 |
| 2021/0099253 A1* | 4/2021 | Kim ................... H04L 5/0055 |

\* cited by examiner

HE extended range SU PPDU format

FIG. 19

| Legacy PHY header (e.g., L-STF/LTF/SIG) | HARQ-SIG (EOB=0) | HARQ-STF, HARQ-LTF | HARQ-Burst #1 (A-MPDU) | HARQ CRC | HARQ-SIG (EOB=1) | HARQ-Burst #2 (A-MPDU) | HARQ CRC |

| Name | Description |
|---|---|
| Format | 0: HARQ SU PPDU |
| DL / UL | 0: DL, 1: UL |
| MCS | |
| BSS Color | |
| BW | |
| ... | ... |
| STA ID | DL: RXID, UL: TXID |
| End of Burst (EOB) | 0: No last burst<br>1: Last burst |
| Burst Size | HARQ burst size |
| CH_ID | HARQ channel ID |
| AI_SN | Toggled: New / ReTx |
| HARQ sequence | e.g., 0 x FF |

| Name | Description |
|---|---|
| Format | 0: HARQ SU PPDU |
| DL / UL | 0: DL, 1: UL |
| MCS | |
| BSS Color | |
| BW | |
| ... | ... |
| STA ID | DL: RXID, UL: TXID |
| End of Burst (EOB) | 0: No last burst<br>1: Last burst |
| Burst Size | HARQ burst size |
| CH_ID | HARQ channel ID |
| AI_SN | Toggled: New / ReTx |
| HARQ sequence | e.g., 0 x FF |

FIG. 31

| Legacy PHY header (e.g., L-STF/LTF/SIG) | HE-SIG-A (HARQ indicator=1) | New HE-SIG-B (DL & UL) | HE-STF, HE-LTF | HARQ-SIG | HARQ-Burst (A-MPDU) - STA1 | Burst CRC |
|---|---|---|---|---|---|---|
| | | | HE-STF, HE-LTF | HARQ-SIG | HARQ-Burst (A-MPDU) - STA2 | Burst CRC |

FIG. 32

| Legacy PHY header (e.g., L-STF/L-LTF/SIG) | HE-SIG-A (HARQ indicator=1) | New HE-SIG-B (DL & UL) | HE-STF, HE-LTF | HARQ-SIG | HARQ-Burst #1 (A-MPDU) - STA1 | Burst CRC | HARQ-SIG | HARQ-Burst #2 (A-MPDU) | Burst CRC |
|---|---|---|---|---|---|---|---|---|---|
| | | | HE-STF HE-LTF | HARQ-SIG | HARQ-Burst #1 (A-MPDU) - STA2 | Burst CRC | HARQ-SIG | HARQ-Burst #2 (A-MPDU) | Burst CRC |

METHOD FOR TRANSMITTING OR RECEIVING FRAME IN WIRELESS LAN, AND DEVICE THEREFOR

CROSS-REFERENCE TO RELATED APPLICATIONS

This application is a National Stage application under 35 U.S.C. § 371 of International Application No. PCT/KR2018/014347, filed on Nov. 21, 2018, which claims the benefit of Korean Application No. 10-2018-0034149, filed on Mar. 23, 2018, U.S. Provisional Application No. 62/607,327, filed on Dec. 19, 2017, and U.S. Provisional Application No. 62/588,942, filed on Nov. 21, 2017. The disclosures of the prior applications are incorporated by reference in their entirety.

TECHNICAL FIELD

The present disclosure relates to a wireless LAN system, and more particularly, to a method for transmitting or receiving a frame based on HARQ process and a device therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11 g provides a transmission rate of 54 Mbps by applying Orthogonal Frequency Division Multiplexing (OFDM) at 2.4 GHz. IEEE 802.1 in provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11 ac that uses a bandwidth of up to 160 MHz and supports a transmission rate of up to 1 Gbits/s for 8 spatial streams and IEEE 802.1 lax standards are under discussion.

DISCLOSURE

Technical Problem

An object of the present disclosure is to provide a PPDU configuration for transmitting or receiving PPDU based on HARQ process in a wireless LAN, a method for operating a physical layer, and STA/AP device.

The objects that could be achieved with the present disclosure are not limited to what has been particularly described hereinabove, and other objects that the present disclosure could achieve will be more clearly understood from the following detailed description.

Technical Solution

To achieve the object of the present disclosure, a method for transmitting a hybrid automatic repeat request (HARQ) physical protocol data unit (PPDU) by a station (STA) in a wireless LAN (WLAN) supporting HARQ process according to one aspect of the present disclosure comprises generating a HARQ PPDU including allocation information on HARQ burst, which is unit data to which the HARQ process is applied, and multiple HARQ bursts; and transmitting the HARQ PPDU, wherein the HARQ PPDU includes a HARQ signaling (SIG) field of a physical layer for transmitting the allocation information on HARQ burst, and the allocation information on HARQ burst includes STA ID for each of the multiple HARQ bursts, HARQ burst size information, HARQ process channel ID and information indicating, in a toggle manner, whether a transmission is a new transmission or retransmission.

To achieve the object of the present disclosure, a method for receiving a hybrid automatic repeat request (HARQ) physical protocol data unit (PPDU) by a station (STA) in a wireless LAN (WLAN) supporting HARQ process according to another aspect of the present disclosure comprises receiving a HARQ PPDU including allocation information on HARQ burst, which is unit data to which the HARQ process is applied, and multiple HARQ bursts; and performing decoding for at least one of the multiple HARQ bursts based on the allocation information on HARQ burst, wherein the HARQ PPDU includes a HARQ signaling (SIG) field of a physical layer for transmitting the allocation information on HARQ burst, and the allocation information on HARQ burst includes STA ID for each of the multiple HARQ bursts, HARQ burst size information, HARQ process channel ID and information indicating, in a toggle manner, whether a transmission is a new transmission or retransmission.

To achieve the object of the present disclosure, a station (STA) for transmitting a hybrid automatic repeat request (HARQ) physical protocol data unit (PPDU) in a wireless LAN (WLAN) supporting HARQ process according to still another aspect of the present disclosure comprises a processor generating a HARQ PPDU including allocation information on HARQ burst, which is unit data to which the HARQ process is applied, and multiple HARQ bursts; and a transmitter transmitting the HARQ PPDU, wherein the HARQ PPDU includes a HARQ signaling (SIG) field of a physical layer for transmitting the allocation information on HARQ burst, and the allocation information on HARQ burst includes STA ID for each of the multiple HARQ bursts, HARQ burst size information, HARQ process channel ID and information indicating, in a toggle manner, whether a transmission is a new transmission or retransmission.

To achieve the object of the present disclosure, a station (STA) for receiving a hybrid automatic repeat request (HARQ) physical protocol data unit (PPDU) in a wireless LAN (WLAN) supporting HARQ process according to further still another aspect of the present disclosure comprises a receiver receiving a HARQ PPDU including allocation information on HARQ burst, which is unit data to which the HARQ process is applied, and multiple HARQ bursts; and a processor performing decoding for at least one of the multiple HARQ bursts based on the allocation information on HARQ burst, wherein the HARQ PPDU includes a HARQ signaling (SIG) field of a physical layer for transmitting the allocation information on HARQ burst, and the allocation information on HARQ burst includes STA ID for each of the multiple HARQ bursts, HARQ burst size information, HARQ process channel ID and information indicating, in a toggle manner, whether a transmission is a new transmission or retransmission.

The HARQ PPDU is MU(multi-user) format, the multiple HARQ bursts may be provided to multiple STAs in a frequency domain through multiple channels, and MCS (modulation and coding scheme) may independently be configured per HARQ burst.

The HARQ SIG field for transmitting allocation information on HARQ burst may be transmitted individually for each of the multiple channels or transmitted to all of the multiple channels as one field.

The allocation information for HARQ burst may be categorized into first type information for HARQ bursts transmitted from odd numbered channels of the multiple channels and second type information for HARQ bursts transmitted from even numbered channels.

The first type information may be repeated in the odd numbered channels, and the second type information may be repeated in the even numbered channels.

The HARQ PPDU is SU(single user) format, the multiple HARQ bursts may be multiplexed in a time domain, and HARQ SIG field may independently be provided for each HARQ burst.

Each HARQ SIG field may include HARQ sequence indicating that a current field is HARQ SIG field and information indicating whether a current HARQ burst is the last HARQ burst.

Advantageous Effects

According to one embodiment of the present disclosure, since allocation information on HARQ burst is provided from a physical layer through HARQ SIG field, PPDU transmission and retransmission based on HARQ process may be performed in the physical layer more exactly and efficiently.

Other technical effects in addition to the above-described effects may be inferred from embodiments of the present disclosure.

BRIEF DESCRIPTION OF THE DRAWINGS

FIG. 19 illustrates HARQ PPDU according to still another embodiment of the present disclosure.

FIG. 31 illustrates an example of HE HARQ MU PPDU.

FIG. 32 illustrates an example of HE HARQ MU A-PPDU.

BEST MODE FOR CARRYING OUT THE INVENTION

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure.

The following detailed description includes specific details in order to provide a thorough understanding of the present disclosure. However, it will be apparent to those skilled in the art that the present disclosure may be practiced without such specific details. In some instances, known structures and devices are omitted or are shown in block diagram form, focusing on important features of the structures and devices, so as not to obscure the concept of the present disclosure.

As described before, the following description is given of a method and apparatus for increasing a spatial reuse rate in a Wireless Local Area Network (WLAN) system. To do so, a WLAN system to which the present disclosure is applied will first be described in detail.

Figure 1:
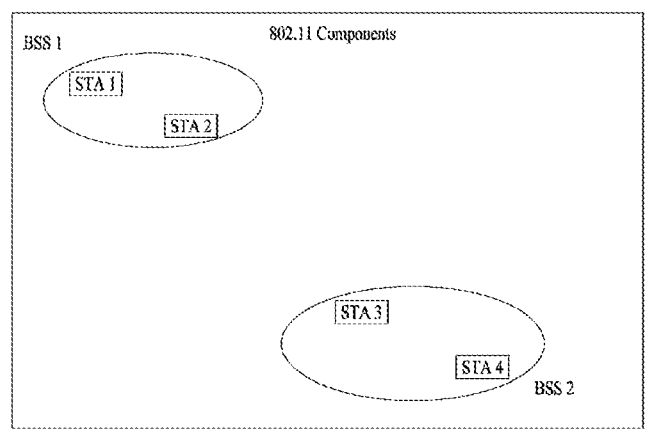
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
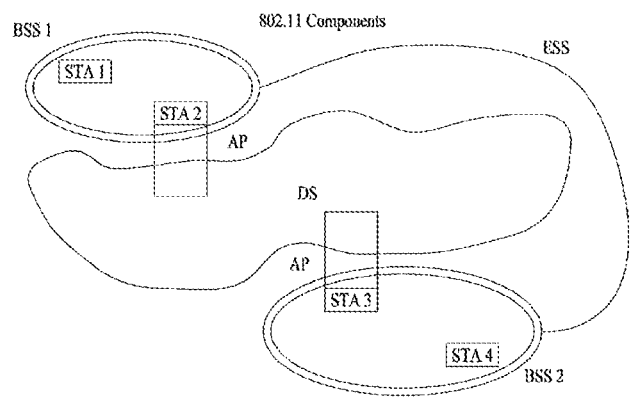
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
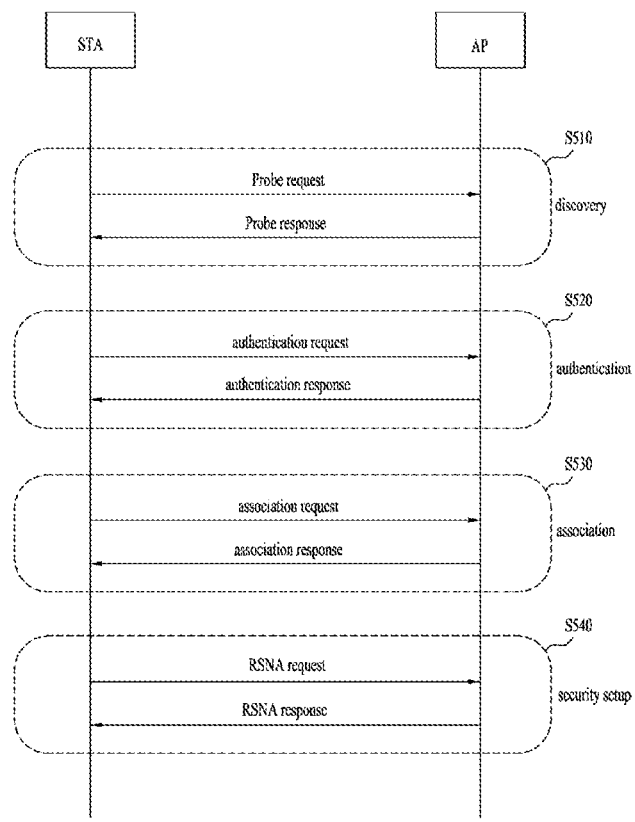
FIG. 3 illustrates a general link setup procedure.

FIG. 3 is a flowchart explaining a general link setup process according to an exemplary embodiment of the present disclosure.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
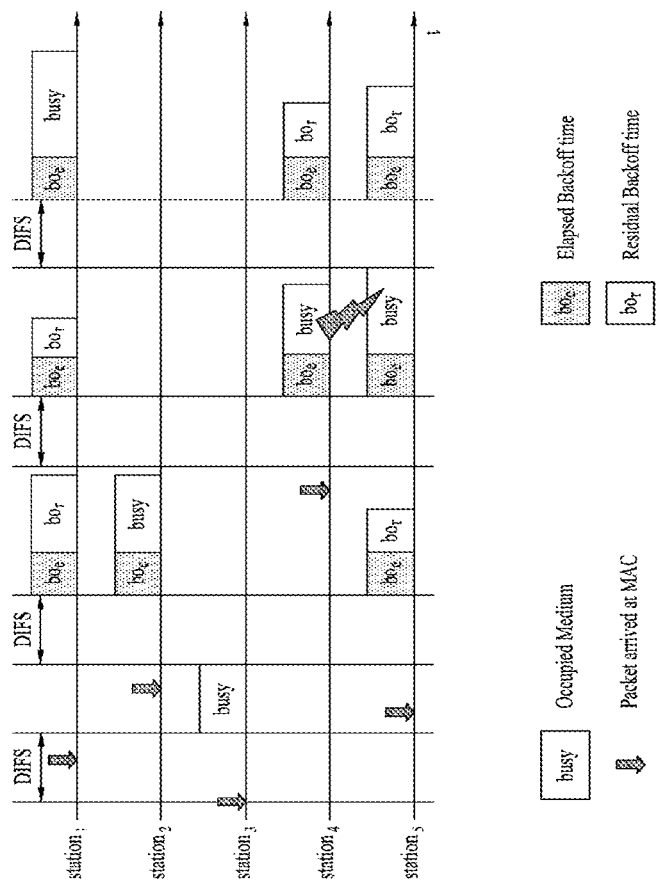
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to 2n−1 (where n= 0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present disclosure.

Figure 5:
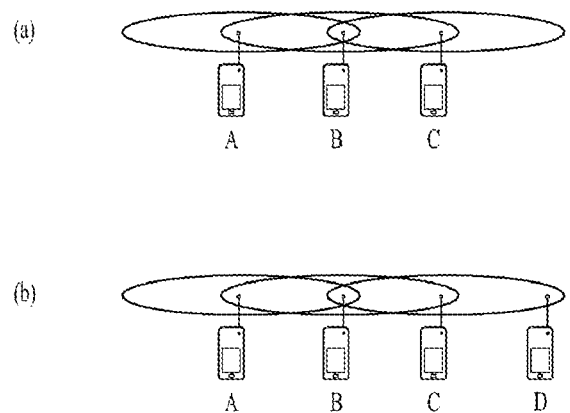
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
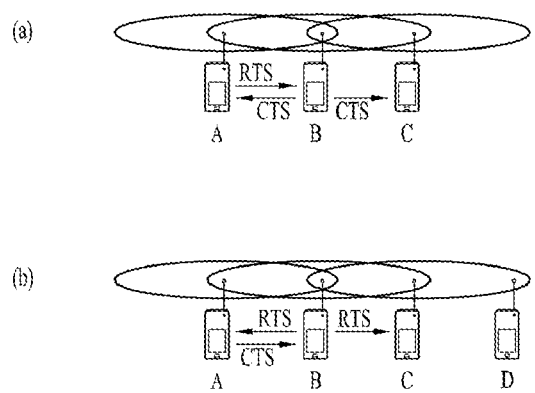
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
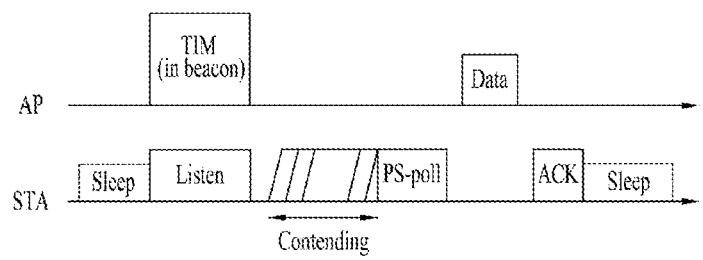
FIGS. 7 to 9 are explanatory diagrams of operation of an STA that has received TIM.
Figure 8:
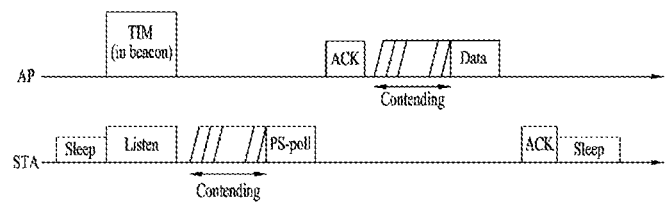
Figure 9:
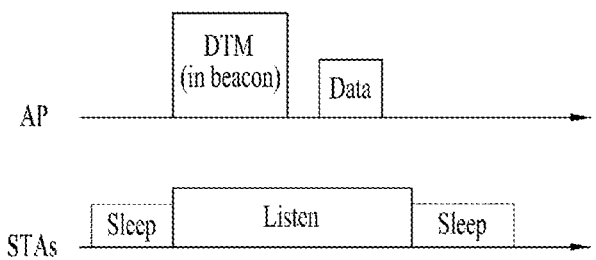

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
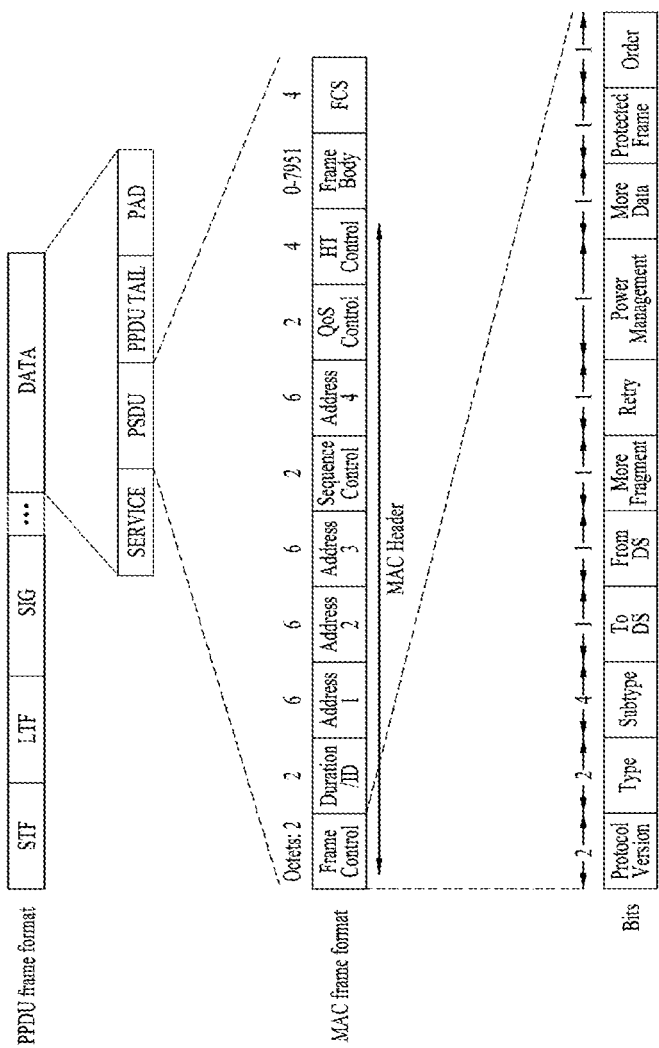
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
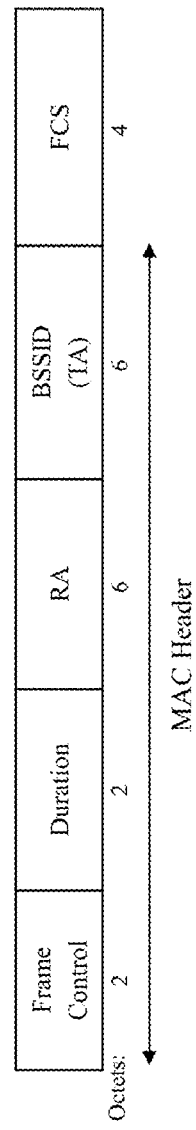
FIG. 11 illustrates a contention free-(CF)-END frame.
Figure 12:
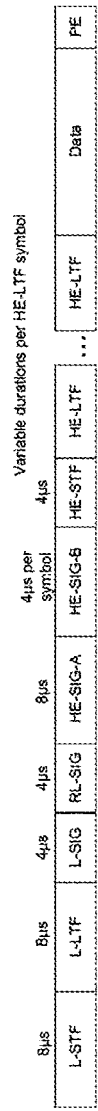
FIGS. 12 to 15 illustrate HE PPDUs.
Figure 13:
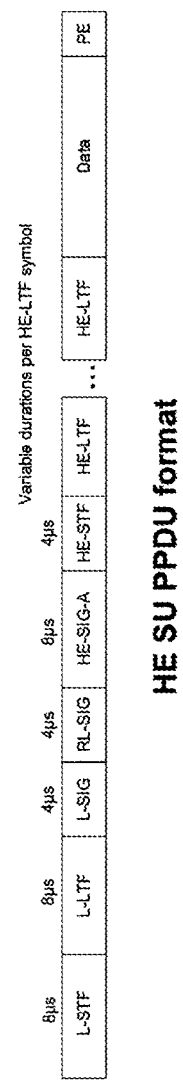
Figure 14:
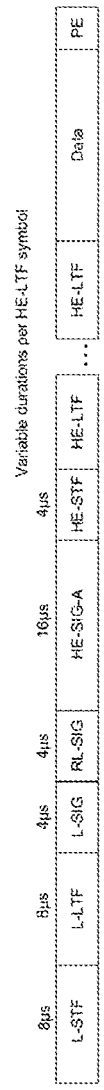
Figure 15:
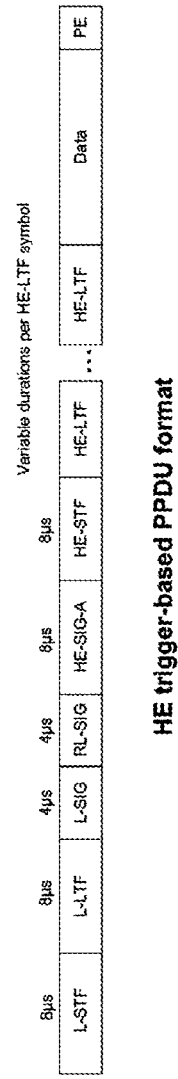

FIG. 11 illustrates a contention free-(CF)-END frame.

For convenience of description, it is assumed that CF-END frame is transmitted by a non-DMG(directional multi-gigabit, 11ad) STA. The CF-END frame may be transmitted for truncation of TXOP duration. Therefore, a duration field is set to 0 in the CF-END frame. RA (Receiver Address) field may be set to a broadcast group address. A BSSID field may be set to an address of STA included in AP. However, in case of CF-END frame of a non-HT or non-HT duplicate format transmitted from VHT STA to VHT AP, Individual/Group of BSSID field may be set to 1.

Example of HE PPDU Structure

Hereinafter, examples of HE PPDU (High Efficiency Physical layer Protocol Data Unit) format in a wireless LAN system that supports 11ax will be described.

FIGS. 12 to 15 illustrate HE PPDUs.

HE-SIG A field is located next to L-Part (e.g., L-STF, L-LTF, L-SIG), and is duplicated in a unit of 20 MHz in the same manner as L-Part. HE-SIG A may be included in all HE PPDUs, whereas HE-SIG B may be omitted from SU PPDU and UL trigger based PPDU (e.g., UL PPDU transmitted based on trigger frame).

HE-SIG A includes common control information (e.g., BW, GI length, BSS Color, CRC, Tail, etc.) on STAs. The HE-SIG A field includes information for interpreting HE PPDU, and therefore information included in the HE-SIG A field may be varied depending on a format (e.g., SU PPDU, MU PPDU or trigger based PPDU, etc.) of HE PPDU.

For example, (i) in HE SU PPDU format, the HE-SIG A field may include at least one of DL/UL indicator, HE PPDU format indicator, BSS Color, TXOP Duration, BW(bandwidth), MCS, CP+LTF length, coding information, the number of streams, STBC (e.g., whether STBC has been used), transmission beamforming (TxBF) information, CRC and Tail. In case of the HE SU PPDU format, the HE-SIG B field may be omitted. (ii) in HE MU PPDU format, the HE-SIG A field may include at least one of DL/UL indicator, BSS Color, TXOP Duration, BW(bandwidth), MCS information of the SIG B field, the number of symbols of the SIG B field, the number of HE LTF symbols, an indicator indicating whether full bandwidth MU-MIMO has been used, CP+LTF length, transmission beamforming (TxBF) information, CRC and Tail. (iii) in HE trigger based PPDU format, the HE-SIG A field may include at least one of a format indicator(e.g., SU PPDU or trigger based PPDU), BSS Color, TXOP Duration, BW, CRC and Tail.

In addition to the aforementioned common information, at least one of user allocation information, for example, STA identifier such as PAID or GID, allocated resource information and the number of streams (Nsts) may be included in HE-SIG A.

BSS color information included in the HE-SIG A field is information for identifying BSS, and has a length shorter than BSSID. For example, BSSID has a length of 48 bits, whereas the BSS color information may have a length of 6 bits. The STA may determine whether the BSS color information is an intra-BSS frame. That is, the STA may an identify intra BSS PPDU from an inter BSS PPDU through the BSS color information even though the HE-SIG A field is only decoded without fully decoding HE PPDU.

The HE-SIG B may independently be encoded per 20 MHz channel unit. The HE-SIG B encoded per 20 MHz channel may be referred to as HE-SIG-B content channel.

According to one embodiment, if a bandwidth is not greater than 20 MHz, one HE-SIG B content channel may be transmitted. If the bandwidth is greater than 20 MHz, 20 any one of a first HE-SIG B content channel(hereinafter, HE-SIG B [1]) or a second HE-SIG B content channel(hereinafter, HE-SIG B [2]) in MHz sized channels may be transmitted. For example, HE-SIG B [1] and HE-SIG B [2] may be transmitted alternately. As an odd numbered 20 MHz channel, HE-SIG B [1] may be transmitted, and as an even numbered 20 MHz channel, HE-SIG B [2] may be transmitted. In more detail, in case of 40 MHz bandwidth, HE-SIG B [1] is transmitted on the first 20 MHz channel, and HE-SIG B [2] is transmitted on the second 20 MHz channel. In case of 80 MHz bandwidth, HE-SIG B [1] is transmitted on the first 20 MHz channel, HE-SIG B [2] is transmitted on the second 20 MHz channel, the same HE-SIG B [1] is repeatedly transmitted on a third 20 MHz channel, and the same HE-SIG B [2] is repeatedly transmitted on a fourth 20 MHz channel. Similarly, the HE-SIG B [1] and the HE-SIG B [2] are transmitted even in case of 160 MHz bandwidth.

Meanwhile, contents of the HE-SIG B [1] may be different from those of the HE-SIG B [2]. However, all of the HE-SIG-B [1] have the same contents. Likewise, all of the HE-SIG B [2] have the same contents.

The HE-SIG B may include a common field and a user specific field. The common field may be prior to the user specific field. The common field and the user specific field may be identified from each other by a bit unit not OFDM symbol unit.

The common field of the HE-SIG B includes information on all of STAs designated to receive PPDU at a corresponding bandwidth. The common field may include RU(resource unit) allocation information. For example, when four 20 MHz channel constituting 80 MHz are identified by [LL, LR, RL, RR], a common block of LL and RL may be included in the common field of the HE-SIG B [1], and a common block of LR and RR may be included in the common field of the HE-SIG B [2].

The user specific field of the HE-SIG B may include multiple user fields, each of which may include specific information in an individual STA designated to receive PPDU. For example, the user field may include at least one of, but not limited to, station ID, MCS per STA, the number of streams (Nsts), Coding(e.g., indication of LDPC use), DCM indicator and transmission beamforming information).

PHY Transmission/Reception Procedure

A general PHY transmission/reception procedure in WLAN will be described.

According to the PHY transmission procedure, a PHY terminal converts MPDU (MAC protocol data unit) or A-MPDU (Aggregate MPDU) received from MAC terminal to 1 PSDU (PHY service data unit), and generates and transmits PPDU by inserting Preamble and Tail bits and padding bits (if necessary).

According to the PHY reception procedure, STA/AP performs energy detection and preamble detection (e.g., L/HT/VHT/HE-preamble detection per Wifi version), and acquires information on PSDU configuration from PHY header (e.g., L/HT/VHT/HE-SIG). Afterwards, the STA/AP reads MAC header and reads data based on information on PSDU configuration.

Details of the PHY transmission/reception procedure such as 11n/ac/ac are defined in IEEE 802.11a/ac/ax standard document.

Ack/BA Transmission and Ack Policy

Generally, BA frame is used in response to A-MPDU, and ACK frame is used in response to MPDU.

Figure 16:
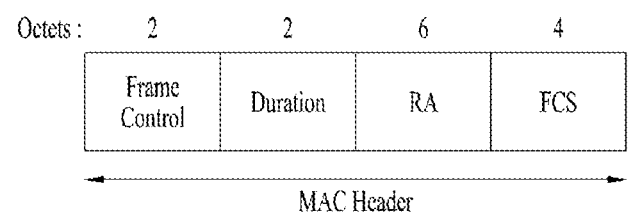
FIG. 16 illustrates ACK frame.

FIG. 16 illustrates ACK frame.

RA field of the ACK frame is set in the same manner as Address 2 field such as a previous frame(e.g., individually addressed data, management, BlockAckReq, BlockACK, PS-poll, etc.). If the ACK frame is transmitted by a non-QoS STA and More Fragments bit of a frame control field of the previous frame is 0, a duration of the ACK frame is set to 0. If the ACK frame is transmitted by a non-QoS STA and More Fragments bit of a frame control field of the previous frame is not 0, a duration of the ACK frame is set to a value obtained by subtracting (ACK transmission time+SIFS) from a Duration/ID field value of the previous frame.

Table 1 illustrates a configuration of BAR(BlockAckReq) frame.

TABLE 1

| MAC header of control frame | | | | |
|---|---|---|---|---|
| BAR control | 2-octet | BAR Ack policy | 1-bit | Immediate Ack/no ack |
| | | Multi-TID | 1-bit | 0x00: Basic BlockAckReq |
| | | Compressed bitmap | 1-bit | 0x01: Compressed BlockAckReq |
| | | | | 0x10: Reserved |
| | | | | 0x11: Multi-TID BlockAckReq |
| | | Reserved | 9-bit | |
| | | TID_INFO | 4-bit | In Basic & Compressed, TID |
| | | | | In Multi-TID, # of TID |

TABLE 1-continued

| MAC header of control frame | | | | |
|---|---|---|---|---|
| BAR information (In Basic & Compressed Block Ack) | Variable | Block Ack Starting Sequence Control | 2-octet | Fragment number (4 bits): 0x00<br>Start Seq Number (12 bits): of the 1st A-MSDU |
| BAR information (In Multi-TID Block Ack) | Variable | Per TID Info | 2-octet * n | Reserved: 12 bits<br>TID value: 4 bits |
| | | Block Ack Starting Sequence Control | 2-octet * n | Fragment number (4 bits): 0x00<br>Start Seq Number (12 bits): of the 1st A-MSDU |
| FCS | 4-octet | | | |

Table 2 illustrates a configuration of BA(block Ack) frame.

TABLE 2

| MAC header of control frame | | |
|---|---|---|
| BA control | 2-octet | Same with BAR control |
| BA information | Variable | Same with BAR information except adding Block Ack Bitmap(128/8/8*n) indicating the received status of up to 64 A-MSDUs |
| FCS | 4-octet | |

Table 3 illustrates a configuration of BA/BAR Ack Policy sub field.

TABLE 3

| Value | Meaning |
|---|---|
| 0 | Normal Acknowledgment.<br>The BA/BAR Ack Policy subfield is set to this value when the sender requires immediate acknowledgment.<br>The addressee returns an Ack frame.<br>The value 0 is not used for data sent under HT-delayed Block Ack/Block Ack Req during a PSMP sequence.<br>The value 0 is not used in frames transmitted by a DMG STA. |
| 1 | No Acknowledgment.<br>The addressee sends no immediate response upon receipt of the frame.<br>The BA/BAR Ack Policy subfield is set to this value when the sender does not require immediate acknowledgment.<br>The value 1 is not used in a Basic BlockAck/BlockAckReq frame outside a PSMP sequence.<br>The value 1 is not used in a Multi-TID BlockAck/BlockAckReq frame. |

The Qos Control field is provided from all data frames of Qos sub field=1. Table 4 illustrates a configuration of QoS Qos Control field.

TABLE 4

| Bits in QoS Control field | | |
|---|---|---|
| Bit 5 | Bit 6 | Meaning |
| 0 | 0 | Normal Ack or Implicit BAR<br>In a frame that is a non-A-MPDU frame or VHT single MPDU:<br>The addressed recipient returns an Ack or QoS + CF-Ack frame after a short interframe space (SIFS) period. A non-DMG STA sets the Ack Policy subfield for individually addressed QoS Null (no data) frames to this value.<br>Otherwise:<br>The addressed recipient returns a BlockAck frame, either individually or as part of an A-MPDU starting a SIFS after the PPDU carrying the frame. |
| 1 | 0 | No Ack<br>The addressed recipient takes no action upon receipt of the frame.<br>The Ack Policy subfield is set to this value in all individually addressed frames in which the sender does not require acknowledgment. The Ack Policy subfield is also set to this value in all group addressed frames that use the QoS frame format except with a TID for which a block ack agreement exists. |

TABLE 4-continued

| Bits in QoS Control field | | |
|---|---|---|
| Bit 5 | Bit 6 | Meaning |
| | | This value of the Ack Policy subfield is not used for QoS Data frames with a TID for which a block ack agreement exists. The Ack Policy subfield for group addressed QoS Null (no data) frames is set to this value. |
| 0 | 1 | No explicit acknowledge or PSMP Ack When bit 6 of the Frame Control field is set to 1 (i.e. No data): There may be a response frame to the frame that is received, but it is neither the Ack frame nor any Data frame of subtype + CF-Ack. The Ack Policy subfield for QoS CF-Poll and QoS CF-Ack + CF-Poll Data frames is set to this value. When bit 6 of the Frame Control field is set to 0: The acknowledgment for a frame indicating PSMP Ack when it appears in a PSMP downlink transmission time (PSMP-DTT) is to be received in a later PSMP uplink transmission time (PSMP-UTT). The acknowledgment for a frame indicating PSMP Ack when it appears in a PSMPUTT is to be received in a later PSMP-DTT. NOTE-Bit 6 of the Frame Control field indicates the absence of a data payload. When equal to 1, the QoS Data frame contains no payload, and any response is generated in response to a QoS CF-Poll or QoS CF-Ack + CF-Poll frame, but does not signify an acknowledgment of data. When set to 0, the QoS Data frame contains a payload. |
| 1 | 1 | BA The addressed recipient takes no action upon the receipt of the frame except for recording the state. The recipient can expect a BlockAckReq frame in the future |

RU Based HARQ PPDU Structure for WLAN

According to HARQ (hybrid automatic repeat request), initial transmission and retransmission are combined with each other to finally and normally receive data, and data may normally be received even by very small retransmission.

Although ARQ protocol has been used in the legacy wireless LAN, HARQ process may be introduced in a next generation wireless LAN to select more active MCS and improve a data rate at a cell edge.

A method for configuring HARQ Burst(or HARQ frame or HARQ PPDU) by a transmitter for HARQ introduction in a next generation wireless LAN system will be described. HARQ Burst may mean unit data to which HARQ process is applied.

Figure 17:
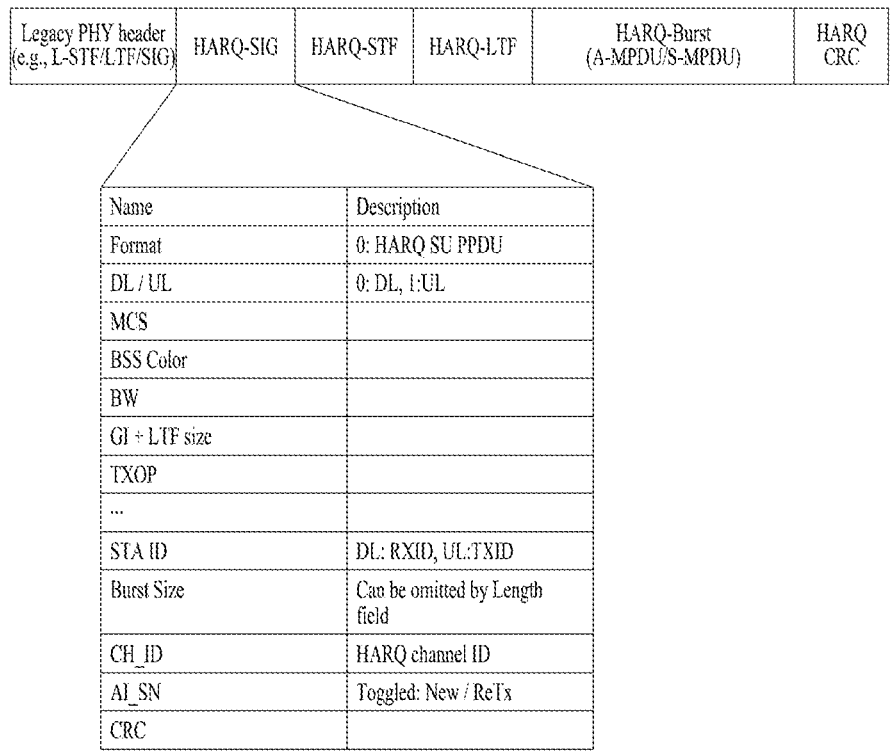
FIG. 17 illustrates HARQ PPDU according to one embodiment of the present disclosure.

FIG. 17 illustrates HARQ PPDU according to one embodiment of the present disclosure. The HARQ PPDU of FIG. 17 may correspond to HARQ SU PPDU format.

HARQ Burst allocation information may be transmitted by being merged with SIG-A information(e.g., HE-SIG A or VHT-SIG-A).

Referring to FIG. 17, Legacy PHY Header (e.g., L-STF, L-LTF, L-SIG) is located at a front side of HARQ SU PPDU, and then HARQ-SIG, HARQ-STF, HARQ-LTF, HARQ Burst (e.g., A-MPDU or Single MPDU) and/or HARQ CRC may be located sequentially.

The HARQ-SIG may include at least one of Format field(e.g., field indicating whether frame is SU PPDU), DL/UL field(e.g., 0: DL, 1: UL), MCS information, BSS Color, BW (e.g., bandwidth of PPDU), GI+LTF size (e.g., CP size), TXOP Duration information and HARQ Burst allocation information.

HARQ Burst allocation information may include at least one of STA ID (e.g., RXID in case of DL and TXID in case of UL), Burst size indicating HARQ Burst size, HARQ channel ID (CH_ID) and AI_SN (e.g., indicating whether it is New transmission/Retransmission depending on toggle). CRC and Tail bits may be located at the end of the HARQ Burst allocation information. If the STA may calculate HARQ Burst size through a length field of L-SIG, HARQ Burst size may be omitted.

In addition to the HARQ Burst allocation information listed above, other HARQ related information may additionally be provided. For example, information (e.g., I/CC indication) indicating whether HARQ operation is CC(chase combining) scheme or IR(increment redundancy) may be indicated in the HARQ Burst allocation information.

The HARQ Burst allocation information may be referred to as another title, for example, HARQ related information or HARQ information.

If HARQ Burst allocation information is fully transmitted to one HARQ-SIG as illustrated in FIG. 17, a new SIG for only HARQ Burst allocation information may not be required, and one HARQ-SIG is only transmitted, whereby signaling overhead may be minimized.

Figure 18:
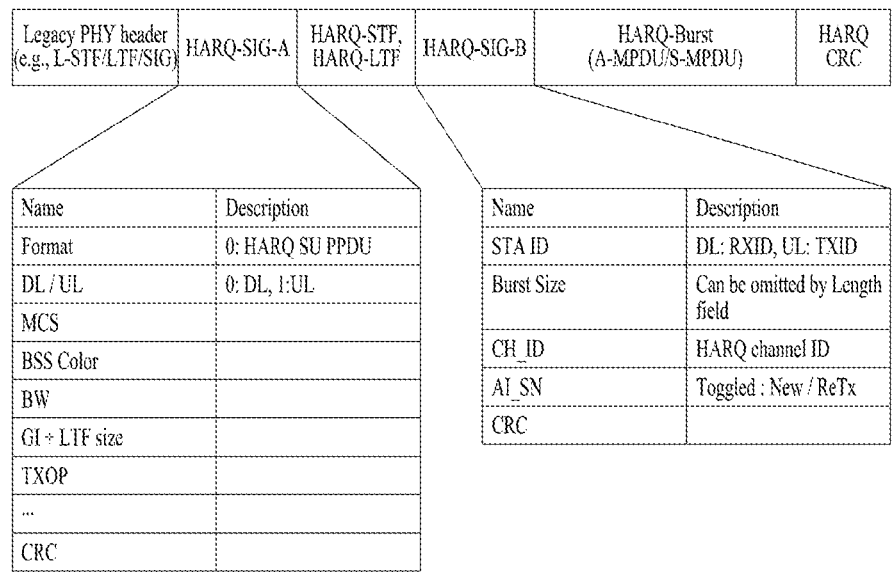
FIG. 18 illustrates HARQ PPDU according to another embodiment of the present disclosure.

FIG. 18 illustrates HARQ PPDU according to another embodiment of the present disclosure. The HARQ PPDU may correspond to HARQ SU PPDU format.

Referring to FIG. 18, the HARQ Burst allocation information may be transmitted through a separate field from SIG-A information.

Information for full PPDU transmission may be included in the HARQ-SIG-A, and the HARQ Burst allocation information (e.g., STA ID, Burst size, CH_ID, AI_SN, etc.) may be included in HARQ-SIG-B. Although FIG. 18 illustrates that HARQ-SIG-B is located next to HARQ-STF and HARQ-LTF, according to another embodiment of the present disclosure, HARQ-SIG-B may be located next to HARQ-SIG-A. If HARQ Burst size may be calculated through a length field of L-SIG, HARQ Burst size field may be omitted.

According to the structure of FIG. 18, HARQ-SIG-A may use Legacy numerology (e.g., 1x symbol, non-HT format), and HARQ-SIG-B may use New numerology (e.g., 4× symbol structure, HE numerology). If much information is included in HARQ-SIG-B, overhead may occur.

FIG. 19 illustrates HARQ PPDU according to still another embodiment of the present disclosure.

For example, multiple HARQ Burst may be transmitted through one PPDU, and PPDU that includes such multiple HARQ Bursts will be referred to as HARQ A-PPDU.

In FIG. 19, it is assumed that HARQ Burst allocation information as HARQ SU A-PPDU is merged with SIG-A.

EOB(End of Burst) of the HARQ Burst allocation information indicates whether a current HARQ Burst is the last Burst. If the current HARQ Burst is the last Burst, EOB=1 is set. If the current HARQ Burst is not the last Burst, the reception STA attempts/performs decoding of HARQ-SIG transmitted after a corresponding HARQ Burst.

If an error occurs while the reception STA is decoding middle HARQ SIG/Burst, the STA may have a difficulty in exactly checking an end of HARQ Burst having an error and a start of next HARQ-SIG.

To solve such an error, HARQ sequence having a specific value (in FIG. 19, 0xff or 0xfe) may be transmitted by being included in HARQ-SIG. After an error occurs in the middle HARQ Burst, the STA searches whether HARQ sequence occurs in the PPDU, and if a specific value is found, it may be regarded that HARQ-SIG for next HARQ Burst is found.

In this way, if an error occurs in HARQ-SIG/Burst corresponding to first or middle, the STA performs a process of searching for HARQ sequence. Even though an error occurs in the first or middle HARQ-SIG/Burst, the STA may decode a subsequent HARQ-SIG.

CRC and Tail bits may be transmitted by being included in HARQ-SIG (e.g., the last part of HARQ-SIG).

If HARQ SIG is attached to each HARQ Burst as illustrated in FIG. 19, even though the STA fails in the first or middle HARQ-SIG decoding, the STA may decode the other HARQ Burst by searching for HE-SIG which is transmitted after decoding failure.

Meanwhile, some fields (e.g., Format, DL/UL, BSS Color, BW, . . . ) repeated with the first HARQ-SIG may be omitted from the second HARQ-SIG and HARQ-SIG after the second HARQ-SIG. For example, if HARQ Burst #2 is allocated to STAs different from a STA of HARQ Burst #1, each STA ID is included in each HARQ SIG. However, if HARQ Burst #2 is allocated to the STAs having the same HARQ Burst #1, STA ID may be omitted from the second HARQ SIG. In this way, overhead of HARQ SIG may be reduced.

Each HARQ Burst may be encoded using different MCS, and MCS to which HARQ Burst is applied may be indicated through MCS field information included in HARQ-SIG. If MCS is equally applied to all HARQ Bursts, MCS field may be omitted from a subsequent HARQ-SIG.

Figure 20:
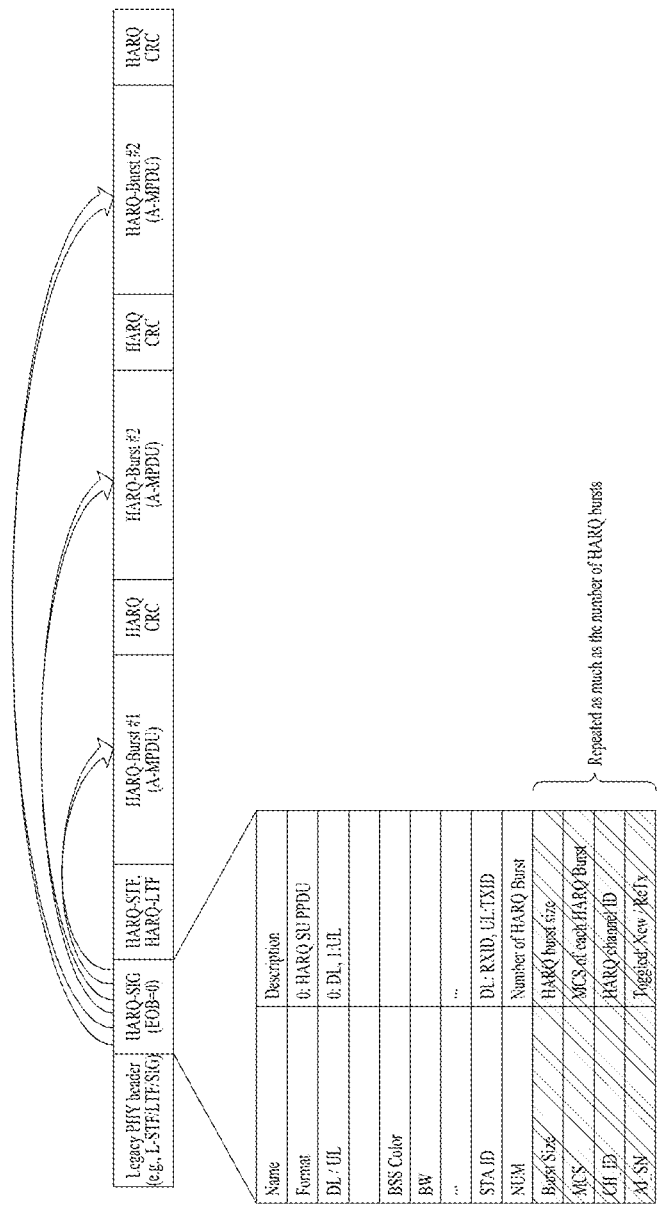
FIG. 20 illustrates another example of HARQ PPDU.

FIG. 20 illustrates another example of HARQ PPDU.

Referring to FIG. 20, HARQ Burst allocation information on each HARQ Burst may be transmitted through a first HARQ SIG.

The HARQ-SIG notifies the STA of allocation information of each HARQ Burst. For example, HARQ Burst allocation information(e.g., HARQ Burst size, MCS, CH_ID, AI_SN, etc.) equivalent to the number of HARQ Bursts may be included in the HARQ-SIG. At this time, a size (e.g., the number of symbols) of the HARQ-SIG may be varied by a NUM value (Number of HARQ Burst size). If MCS is not changed per HARQ Burst, MCS information may be included in entire HARQ-SIG once without being required to be included in repeated HARQ Burst allocation information.

If HARQ Burst #2 is transmission of STA different from HARQ Burst #1, STA ID for each STA may be included in allocation information on each HARQ Burst.

If allocation information on multiple HARQ Bursts included in HARQ-SIG is encoded by one information (e.g., encoding using one CRC), STAs may calculate a start timing for each HARQ Burst based on Burst size information on each HARQ Burst. If allocation information on each HARQ Burst is individually encoded or encoded by some groups, start position information of HARQ burst may be encoded together with Burst size information.

Figure 21:
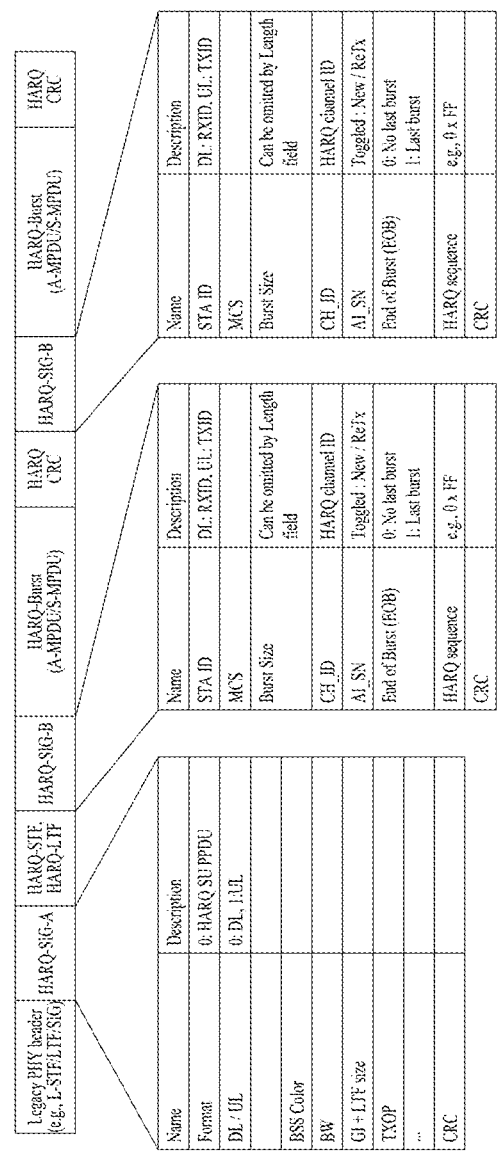
FIG. 21 illustrates still another example of HARQ PPDU.

FIG. 21 illustrates still another example of HARQ PPDU. According to the scheme of FIG. 21, HARQ Burst information is transmitted through HARQ-SIG-B, and HARQ-SIG-B is identified from HARQ SIG-A.

Referring to FIG. 21, since HARQ-SIG-A includes information commonly applied to all HARQ Bursts, signaling overhead may be reduced as compared with HARQ-SIG-A attached to each HARQ Burst. Also, even though the STA fails to normally decode HARQ Burst in the middle of decoding, it is advantageous that subsequent HARQ Burst may be decoded through a subsequent HARQ-SIG-B. However, if the STA fails to read HARQ-SIG-A, a problem occurs in that all HARQ Bursts cannot be decoded.

The HARQ-SIG-B may include HARQ Burst allocation information. Information having the same value as the first HARQ-SIG-B may be omitted from the second HARQ-SIG-B and HARQ-SIG-B transmitted after the second HARQ-SIG-B in the same manner as STA ID information in the second HARQ-SIG-B and HARQ-SIG-B transmitted after the second HARQ-SIG-B.

Figure 22:
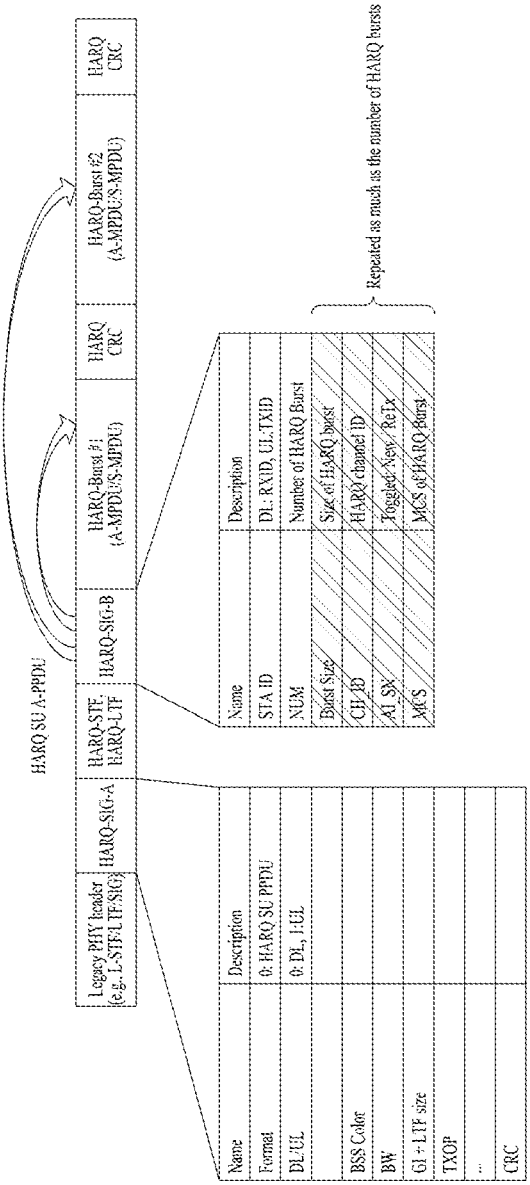
FIG. 22 illustrates further still another example of HARQ PPDU.

FIG. 22 illustrates further still another example of HARQ PPDU. Although FIG. 21 illustrates that a first HARQ-SIG-B is located next to HARQ-STF and HARQ-LTF, the first HARQ-SIG-B may be arranged next to HARQ-SIG-A as illustrated in FIG. 22. The first HARQ-SIG-B may include information on each HARQ Burst.

Referring to FIG. 22, the HARQ-SIG-B may be arranged next to HARQ-STF and HARQ-LTF (e.g., HARQ-SIG-B may be arranged between HARQ-SIG-A and HARQ-STF). The HARQ-SIG-B includes allocation information on each HARQ Burst. In FIG. 22, HARQ Burst allocation information(e.g., HARQ Burst size, MCS, CH_ID, AI_SN, etc.) equivalent to the number of HARQ Bursts may be repeated. At this time, a size (e.g., the number of symbols) of HARQ-SIG-B may be varied by a NUM value (e.g., Number of HARQ Burst size). If MCS is not changed per HARQ Burst, MCS information may representatively be included in one HARQ Burst allocation information without being required to be included in every HARQ Burst allocation information. If HARQ Burst #2 is transmission for STA different from HARQ Burst #1, STA ID for each STA may be included in allocation information on each HARQ Burst.

Figure 23:
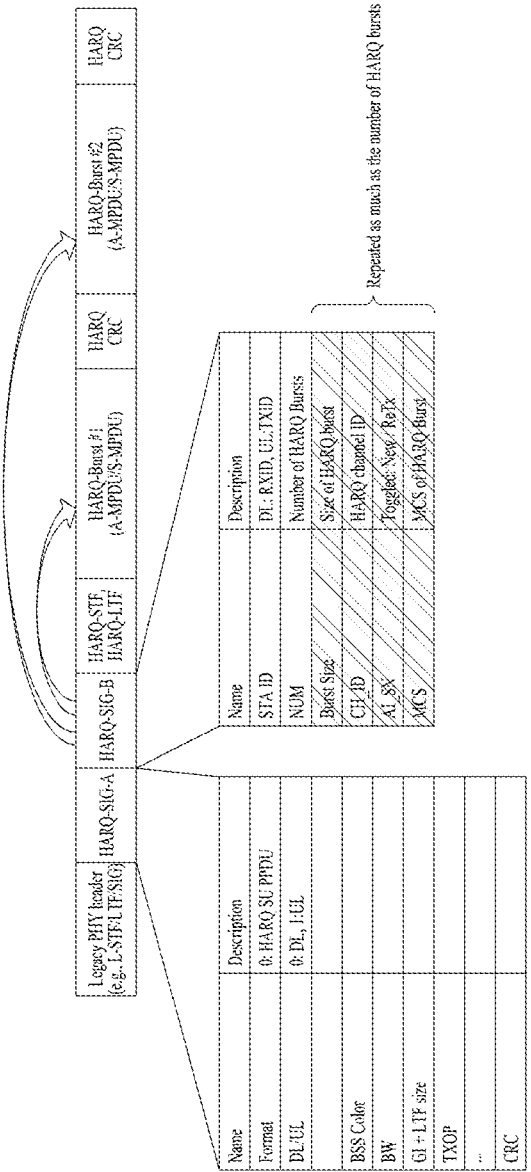
FIG. 23 illustrates further still another example of HARQ PPDU.

FIG. 23 illustrates further still another example of HARQ PPDU.

Referring to FIG. 23, HARQ-SIG-B is arranged next to HARQ-SIG-A, and may be transmitted at a full bandwidth or a non-HT Duplication format. If the HARQ-SIG-B is transmitted at a full bandwidth, it is advantageous that overhead of the HARQ-SIG-B may be reduced. If the HARQ-SIG-B is transmitted at a Non-HT Duplication format, overhead is increased but the STA may receive the HARQ-SIG-B by monitoring only 20 MHz channel, whereby STA implementation complexity may be reduced. If the STA monitors a full bandwidth, it is advantageous that reception performance of the HE-SIG-B is improved through HARQ-SIG-B information duplicated in a unit of 20 MHz.

For another example, similarly to HE-SIG-B transmission structure defined in 11ax, HARQ-SIG-B content [1] may be duplicated at odd numbered channels, and HARQ-SIG-B content [2] may be duplicated at even numbered channels.

This manner may be understood that overhead attenuation effect and attenuation effect of STA complexity are negotiated with each other.

Figure 24:
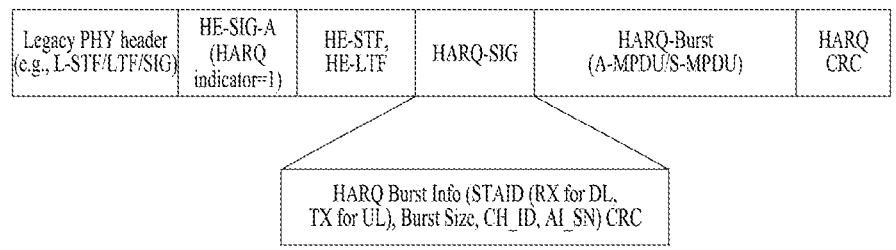
FIG. 24 illustrates further still another example of HARQ PPDU.

FIG. 24 illustrates further still another example of HARQ PPDU.

Referring to FIG. 24, HARQ PPDU may be configured in such a way of enlarging HE PPDU. HARQ indicator may be included in the HE-SIG-A. The HARQ indicator may be information indicating whether corresponding PPDU is general HE PPDU or HE PPDU to which HARQ process is applied. The HARQ indicator may be a newly defined field or a specific value of a field of which use is reserved among the existing fields existing in the HE PPDU.

If the HARQ indicator indicates HARQ PPDU, HARQ-SIG may be provided after the HARQ indicator. In FIG. 24, HARQ-SIG is arranged next to HE-STF and HE-LTF. HARQ Burst allocation related information such as STAID, Burst size, CH_ID, AI_SN, etc. may be included in the HARQ-SIG, and CRC and Tail bits may be attached to the end of the HARQ-SIG.

If the HE-SIG-A is reused in the HARQ PPDU, the legacy 11ax STA may reduce power consumption (e.g., Intra-BSS PPDU power saving) or perform Spatial Reuse based on information (e.g., TXOP, BSS Color, DL/UL indicator, etc.) included in the HE-SIG-A, whereby entire WLAN resource efficiency may be improved.

Figure 25:
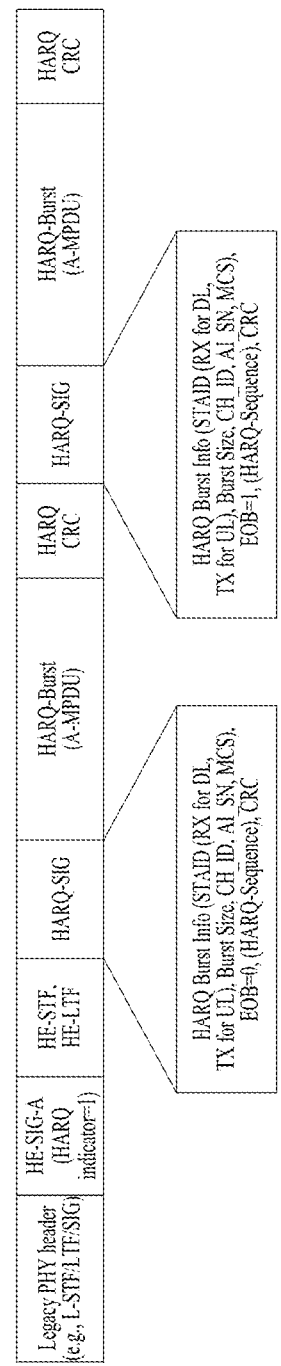
FIG. 25 illustrates an example of HE HARQ SU A-PPDU format.

FIG. 25 illustrates an example of HE HARQ SU A-PPDU format.

Referring to FIG. 25, if HARQ indicator in the HE-SIG A indicates HARQ PPDU, the HARQ-SIG is arranged next to HE-STF/LTF. HARQ Burst allocation information such as STAID, Burst size, CH_ID, AI_SIN, MCS, etc. may be included in the HARQ-SIG. EOB may indicate whether a current HARQ Burst is the last HARQ Burst.

Referring to FIG. 25, if the EOB is set to 0, the STA may attempt decoding of the HARQ-SIG next to the corresponding HARQ Burst. Additionally, HARQ sequence may be included in the HARQ-SIG, and in this case, the STA may detect a subsequent HARQ frame/Burst by using HARQ sequence when a decoding error occurs in the middle of frame. Information/fields having the same value as the first HARQ-SIG, such as STA ID information, may be omitted from the second HARQ-SIG and HARQ-SIG transmitted after the second HARQ-SIG.

Although FIG. 25 illustrates that the first HARQ-SIG is arranged next to HARQ-STF and HARQ-LTF, the first HARQ-SIG may be arranged next to the HARQ-SIG-A.

Figure 26:
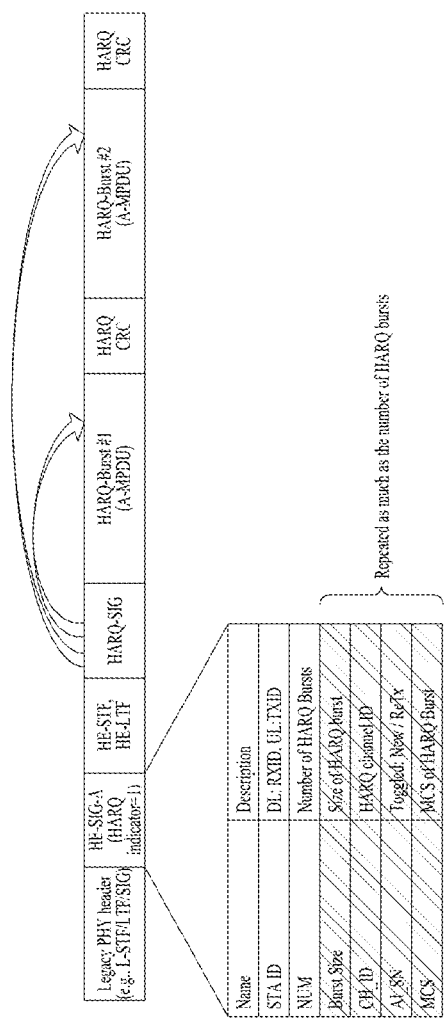
FIG. 26 illustrates another example of HE HARQ SU A-PPDU format.

FIG. 26 illustrates another example of HE HARQ SU A-PPDU format.

Referring to FIG. 26, as described above, the first HARQ-SIG may include allocation information on each HARQ Burst.

In the example of FIG. 26, the HARQ-SIG is located next to HE-STF and HE-LTF. For example, the HARQ-SIG may be located between HE-SIG-A and HE-STF. The HARQ-SIG may include allocation information on each HARQ Burst. HARQ Burst allocation information(e.g., HARQ Burst size, MCS, CH_ID, AI_SN, etc.) equivalent to the number of HARQ Bursts may repeatedly be included in the HARQ SIG. At this time, a size(e.g., the number of symbols) of the HARQ-SIG may be varied by a NUM value (Number of HARQ Burst size). If MCS is not changed per HARQ Burst, MCS information may be included in the ARQ-SIG only once.

Figure 27:
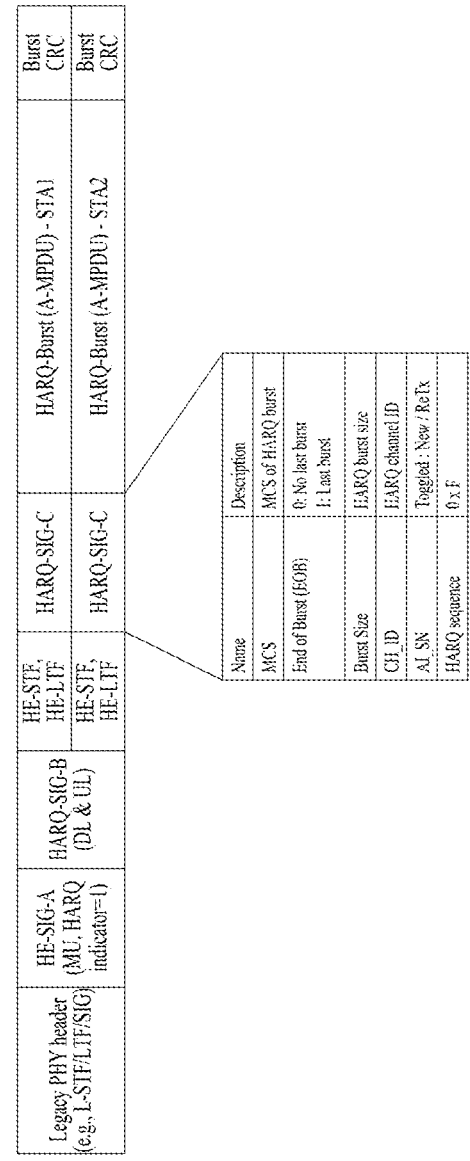
FIG. 27 illustrates HARQ MU PPDU according to one embodiment of the present disclosure.

FIG. 27 illustrates HARQ MU PPDU according to one embodiment of the present disclosure.

Referring to FIG. 27, HARQ Bursts for multiple STAs may be transmitted through one PPDU.

Information (e.g., BW, BSS Color, etc.) common for the STAs may be included in the HARQ-SIG-A. Resource allocation information on each STA may be included in the HARQ-SIG-B. HARQ Burst allocation information may be included in each HARQ-SIG-C.

For another example, HARQ Burst allocation information (e.g., MCS, HARQ Burst size, CH_ID, AI_SN, etc.) of the HARQ-SIG-C may be transmitted by being included in/merged with the HARQ-SIG-B.

The EOB and the HARQ sequence may be omitted from the HARQ MU PPDU.

Figure 28:
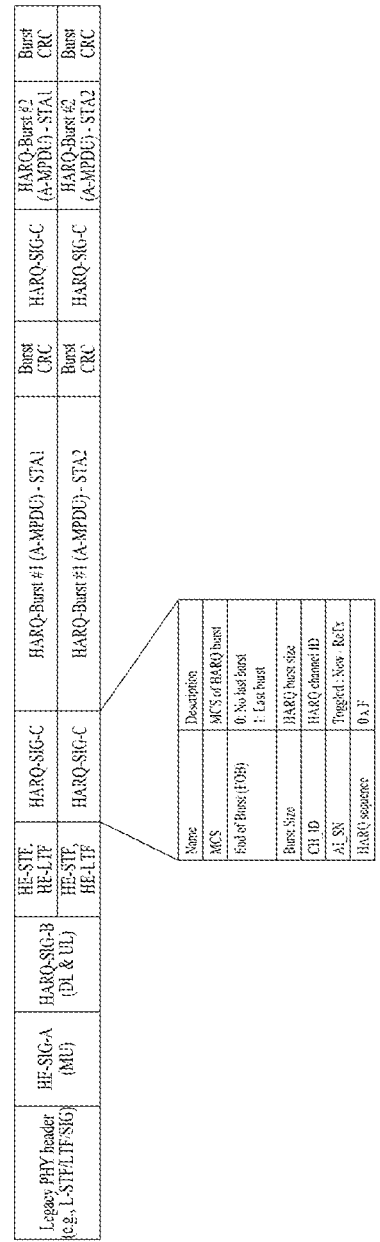
FIG. 28 illustrates HARQ MU PPDU according to another embodiment of the present disclosure.

FIG. 28 illustrates HARQ MU PPDU according to another embodiment of the present disclosure. The HARQ MU PPDU of FIG. 28 may be HARQ MU A-PPDU.

Multiple HARQ Bursts for multiple STAs may be transmitted through HARQ MU A-PPDU.

HARQ Burst allocation information such as Burst size, CH_ID, AI_SIN, MCS may be included in the HARQ-SIG-C. Each HARQ Burst may be encoded by different MCS. For another example, information of the first HARQ-SIG-C may be transmitted by being included in/merged with the HARQ-SIG-B.

Alternatively, the first HARQ-SIG-C may include information on all of the multiple HARQ Bursts.

Figure 29:
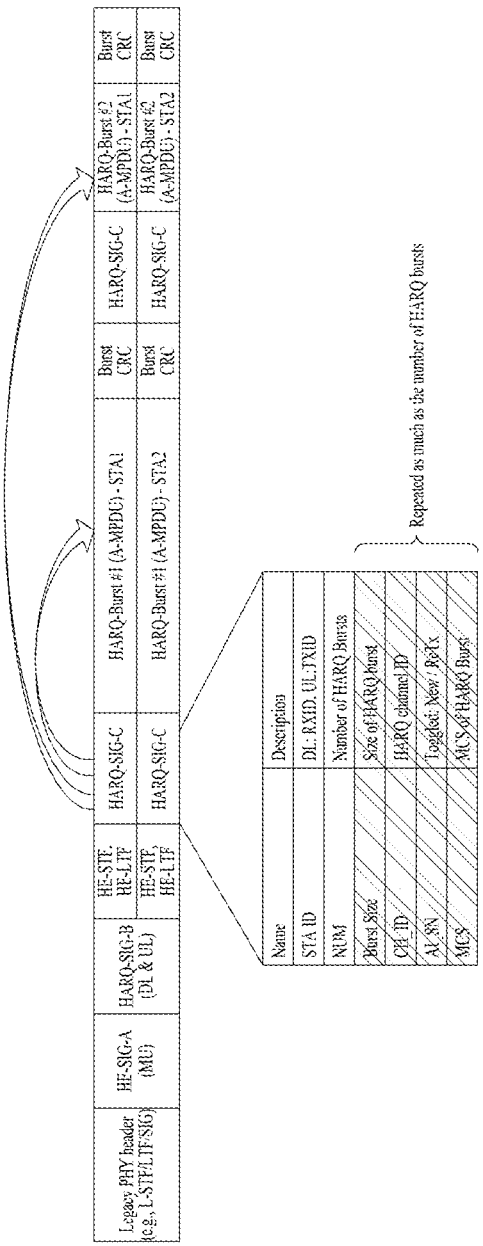
FIG. 29 illustrates another example of HARQ MU PPDU.

FIG. 29 illustrates another example of HARQ MU PPDU.

Referring to FIG. 29, information on each of the multiple HARQ Bursts is included in the HARQ-SIG-C for each STA. The information included in the HARQ-SIG-C may be included in the resource allocation information of each STA in the HARQ-SIG-B.

Figure 30:
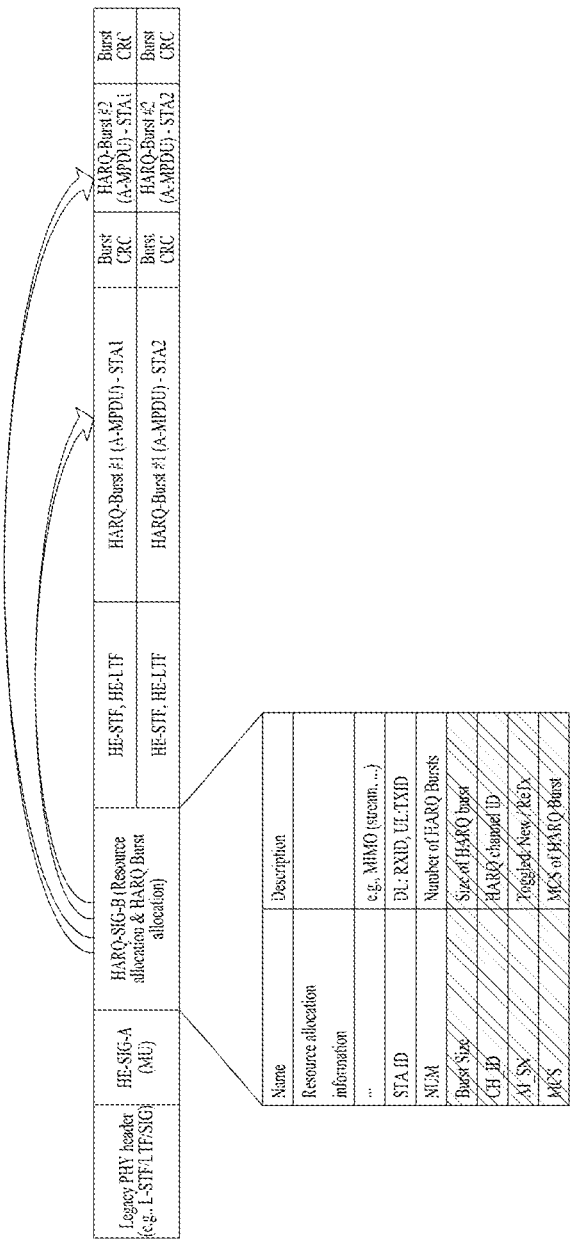
FIG. 30 illustrates still another example of HARQ MU PPDU.

FIG. 30 illustrates still another example of HARQ MU PPDU. In the same manner as the aforementioned SU format, the HARQ Burst allocation information may be included in the HARQ-SIG-B.

Meanwhile, in case of Wider bandwidth (e.g., transmission of bandwidth greater than 20 MHz), as described above, the HE-SIG-B may be transmitted at a full bandwidth, transmitted at a non-HT duplication format or transmitted in the same manner as SIG-B defined in 11ax.

FIG. 31 illustrates an example of HE HARQ MU PPDU.

Referring to FIG. 31, HARQ Burst allocation information such as Burst size, CH_ID, AI_SIN, MCS may be included in the HARQ-SIG, and each HARQ Burst may be encoded using different MCS. Information of the HARQ-SIG may be transmitted by being included in/merged with New HE-SIG-B.

FIG. 32 illustrates an example of HE HARQ MU A-PPDU.

Referring to FIG. 32, HARQ Burst allocation information such as Burst size, CH_ID, AI_SIN, MCS may be included in the HARQ-SIG, and each HARQ Burst may be encoded using different MCS. First, the information of the HARQ-SIG may be transmitted by being included in/merged with New HE-SIG-B.

Figure 33:
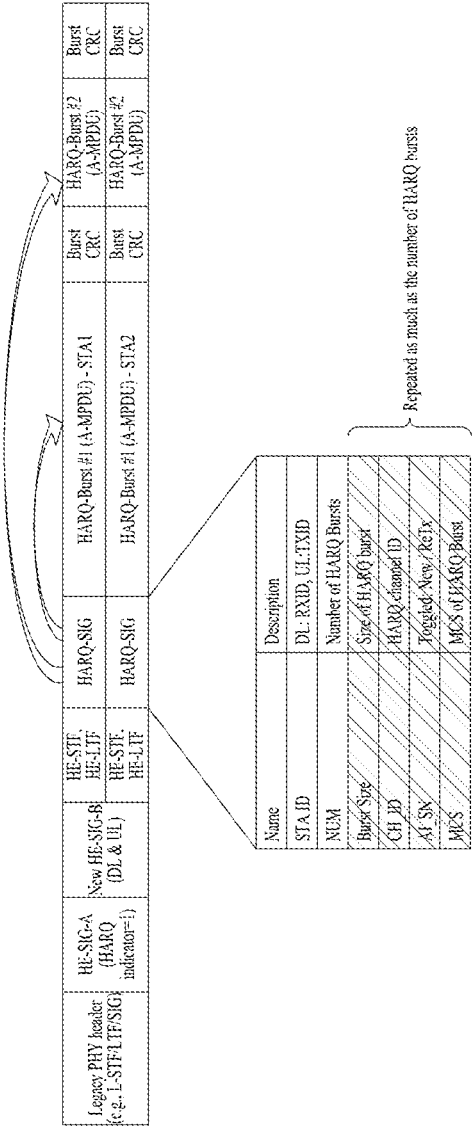
FIG. 33 illustrates another example of HE HARQ MU A-PPDU.

FIG. 33 illustrates another example of HE HARQ MU A-PPDU.

Even in HE HARQ MU A-PPDU, the first HARQ-SIG may include information on all of multiple HARQ Bursts subsequent thereto.

The HARQ-SIG for each STA may include information on each of the multiple HARQ Bursts. The information included in the HARQ-SIG may be included in resource allocation information of each STA in New HE-SIG-B.

Figure 34:
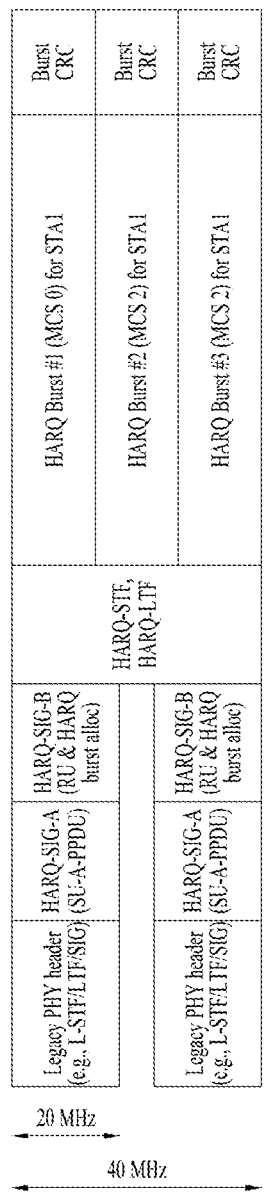
FIG. 34 illustrates HARQ A-PPDU according to another embodiment of the present disclosure.

FIG. 34 illustrates HARQ A-PPDU according to another embodiment of the present disclosure.

When the STA transmits HARQ A-PPDU that includes multiple HARQ Bursts, each HARQ Burst may be transmitted to different frequency positions(/resource regions). For example, the STA may differently set and transmit RU positions for HARQ burst of new HARQ transmission and HARQ Burst of HARQ retransmission among several HARQ Bursts. MCS used by each RU may be different from each other. For example, MCS of retransmission may be different from MCS of new transmission.

The STA may transmit retransmission HARQ Burst to better CQI channel (e.g., channel of high RSSI) or transmit new transmission HARQ Burst to better CQI channel (e.g., channel of high RSSI) based on acquired CQI information.

In FIG. 34, a transmission STA may transmit three HARQ Bursts for STA1 to each RU (resource unit) and differently set MCS for HARQ Burst #1, MCS for HARQ Burst #2 and MCS for HARQ Burst #3.

The HARQ Burst allocation information may be included in the HARQ-SIG-B.

The reception STA may have capability capable of decoding and receiving multiple HARQ Bursts. The transmission STA may have capability capable of encoding and transmitting multiple HARQ Bursts.

In the example of FIG. 34, at Wider bandwidth(e.g., BW>20 MHz), the HARQ-SIG-B may be transmitted by being duplicated in a unit of 20 MHz in the same manner as the HARQ-SIG-A. Alternatively, the HARQ-SIG-B transmitted at each 20 MHz bandwidth may include HARQ Burst allocation information transmitted at each bandwidth. For example, the first HARQ-SIG-B(#1) may include allocation information on HARQ Burst transmitted at a first 20 MHz bandwidth, and the second HARQ-SIG-B(#2) may include allocation information on HARQ Burst transmitted at a second 20 MHz bandwidth. At this time, CRC may be attached to each HARQ-SIG-B transmitted at each bandwidth. At this time, the HARQ-SIG-B may include resource allocation information on HARQ Burst/data transmitted at each bandwidth.

A transmission timing or transmission bandwidth of the HARQ-SIG-B may be changed.

Figure 35:
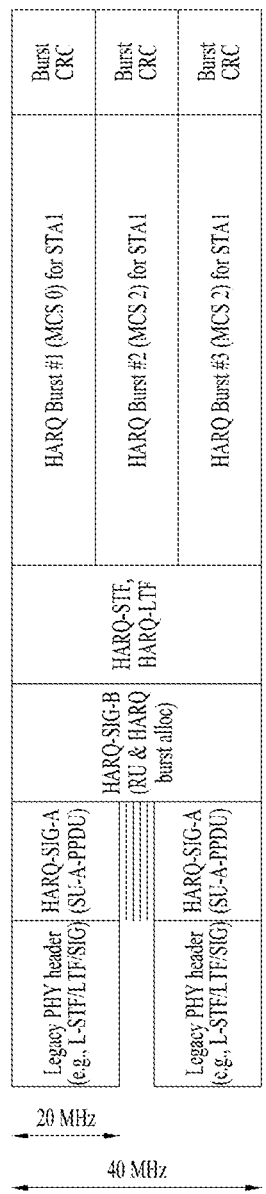
FIG. 35 illustrates HARQ A-PPDU according to still another embodiment of the present disclosure.

FIG. 35 illustrates HARQ A-PPDU according to still another embodiment of the present disclosure.

In FIG. 35, HARQ-SIG-B is transmitted through a full bandwidth. In order to transmit the HARQ-SIG-B through a full bandwidth, measurement sequence/pilot may be transmitted between HARQ-SIG-As (e.g., guard portions). If the HARQ-SIG-A includes 2 symbols, the measurement sequence/pilot may be transmitted from the second symbol. In the structure of FIG. 35, since the HARQ-SIG-B is transmitted using more tones than those in the structure of FIG. 24, gain may be obtained in view of overhead. However, the measurement sequence/pilot is required between bandwidths at which the HARQ-SIG-A is transmitted.

Figure 36:
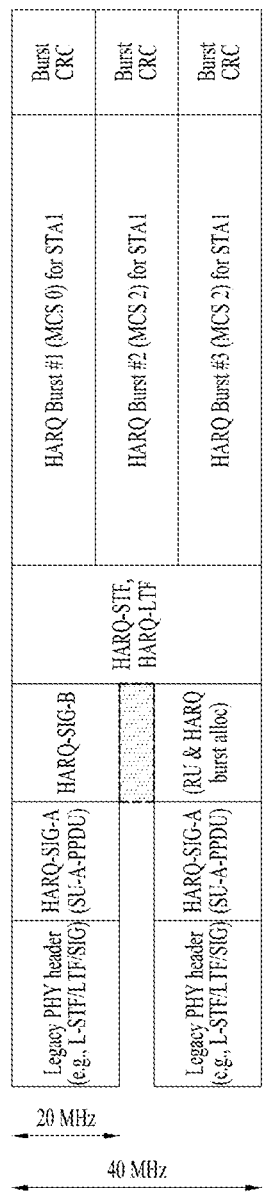
FIG. 36 illustrates HARQ A-PPDU according to further still another embodiment of the present disclosure.

FIG. 36 illustrates HARQ A-PPDU according to further still another embodiment of the present disclosure.

Referring to FIG. 36, the respective HARQ-SIG-Bs are transmitted at the same transmission timing through a full bandwidth. Also, subcarriers (shaded portions of FIG. 36) corresponding to a guard band between the HARQ-SIG-As are emptied. At this time, one CRC of HARQ-SIG-B may be transmitted by being attached to a full bandwidth.

In the manner of FIG. 36, although tones used for HARQ-SIG-B are smaller than those of FIG. 35, only subcarriers corresponding to a guard band are not used and RU allocation information and HARQ Burst allocation information are transmitted at a full bandwidth (e.g., 40 MHz in case of FIG. 36), whereby more information may be transmitted than non-HT duplication in the same manner as the HARQ-SIG-A.

Figure 37:
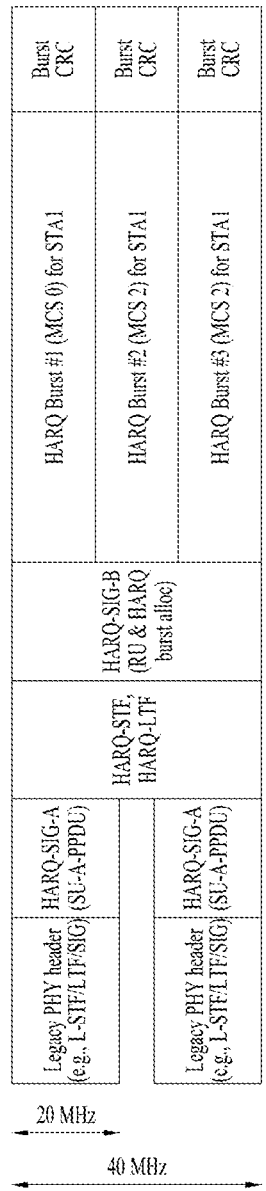
FIG. 37 illustrates HARQ A-PPDU according to further still another embodiment of the present disclosure.

FIG. 37 illustrates HARQ A-PPDU according to further still another embodiment of the present disclosure.

Referring to FIG. 37, the HARQ-SIG-B may be transmitted next to HARQ-STF/HARQ-LTF.

Since the reception STA may perform channel measurement of the HARQ-SIG-B by using HARQ-STF/HARQ-LTF, the transmission STA may not transmit measurement sequence to a guard portion of the HARQ-SIG-A.

Figure 38:
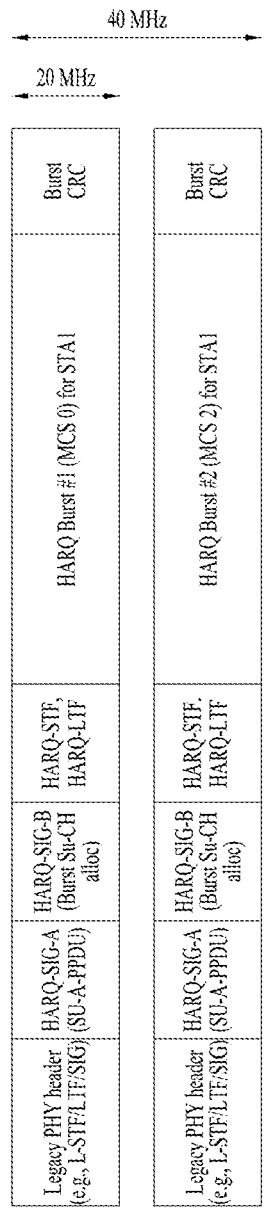
FIG. 38 illustrates HARQ A-PPDU according to further still another embodiment of the present disclosure.

FIG. 38 illustrates HARQ A-PPDU according to further still another embodiment of the present disclosure.

Referring to FIG. 38, when Wider bandwidth is used, multiple HARQ Bursts may be transmitted based on 20 MHz channel.

Unlike FIG. 38, the HARQ-SIG-B may be transmitted next to HARQ-STF/LTF.

Figure 39:
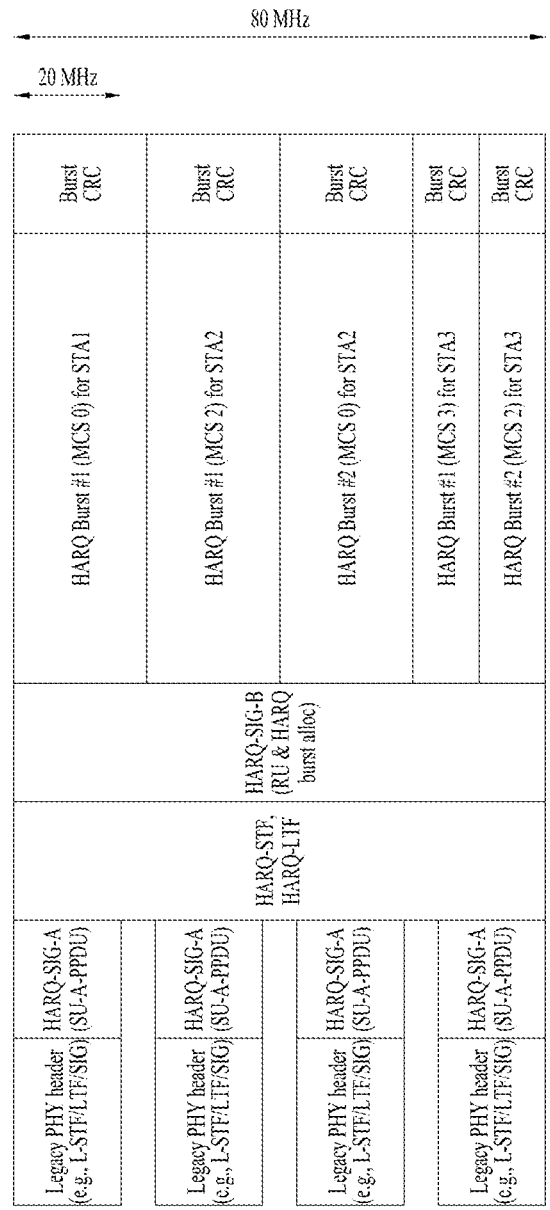
FIG. 39 illustrates an example of transmission of multiple HARQ bursts of MU STAs.

FIG. 39 illustrates an example of transmission of multiple HARQ bursts of MU STAs.

Referring to FIG. 39, the HARQ-SIG-B is transmitted next to HARQ-STF/HARQ-LTF. The transmission STA transmits two HARQ Bursts for STA2 and STA3, and each MCS is used in each HARQ Burst.

Meanwhile, the case that the HARQ-SIG-B is transmitted next to HARQ-STF/HARQ-LTF is one example of a structure and position of the HARQ-SIG-B, and as described in the above SU-A-PPDU, the HARQ-SIG-B may be located next to the HARQ-SIG-A. AT this time, the HARQ-SIG-B may be transmitted at a full bandwidth, or may be transmitted by duplication (e.g., non-HT duplicate format).

Figure 40:
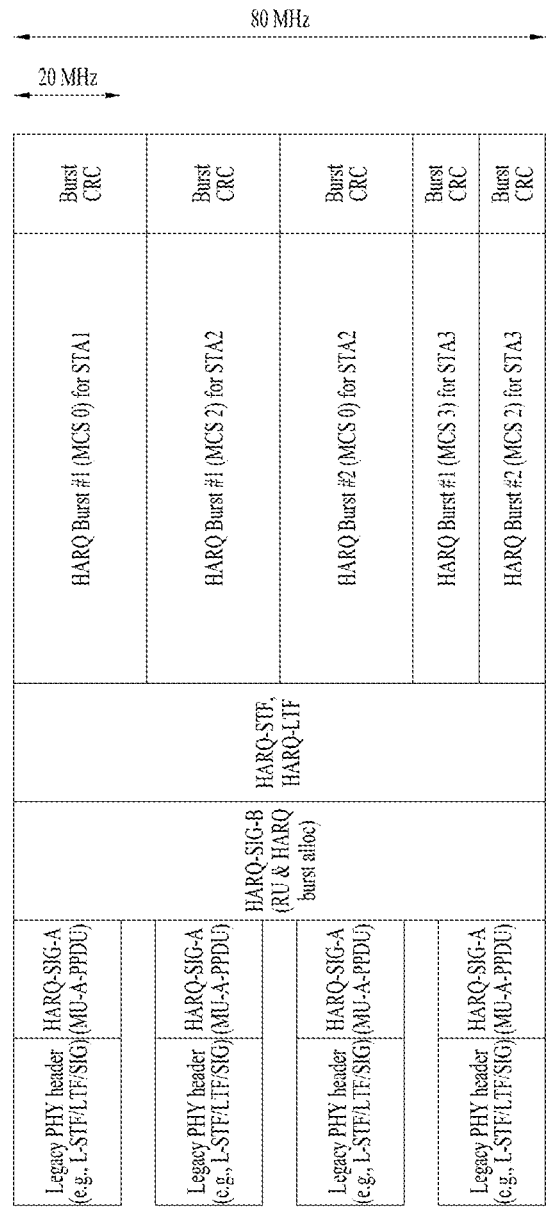
FIG. 40 illustrates that HARQ-SIG-B is transmitted next to HARQ-SIG-A at a full bandwidth.

FIG. 40 illustrates that HARQ-SIG-B is transmitted next to HARQ-SIG-A at a full bandwidth.

Referring to FIG. 40, in order that the HARQ-SIG-B is transmitted at a full bandwidth, measurement sequence/pilot may be transmitted to a guard band between the HARQ-SIG-As.

Figure 41:
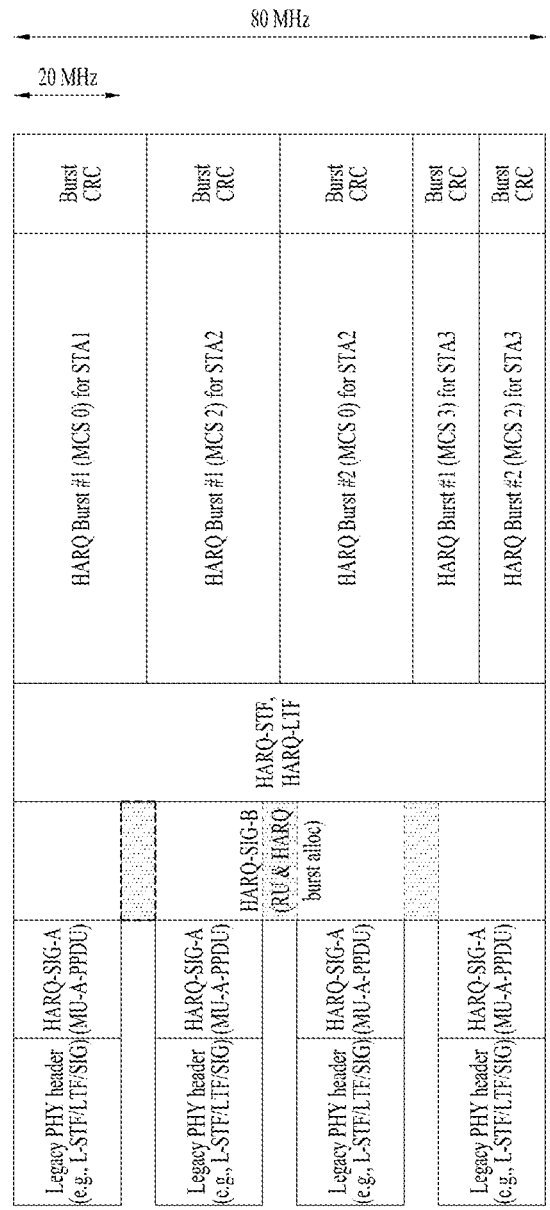
FIG. 41 illustrates that some subcarrier tones are not used when HARQ-SIG-B is transmitted at a full bandwidth.

FIG. 41 illustrates that some subcarrier tones are not used when HARQ-SIG-B is transmitted at a full bandwidth. In detail, tones (i.e., guard tones) to which L-STF/L-LTF is not transmitted at a full bandwidth (e.g., 80 MHz) may be emptied.

Figure 42:
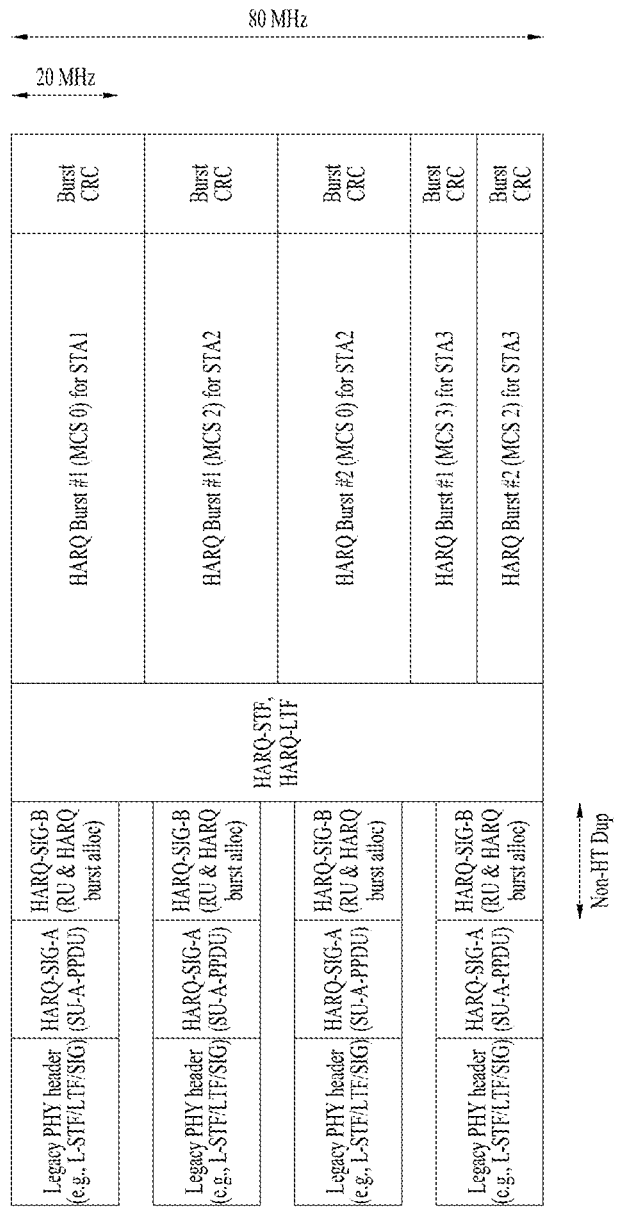
FIG. 42 illustrates that HARQ-SIG-B is transmitted in a non-HT duplication format of 20 MHz unit.

FIG. 42 illustrates that HARQ-SIG-B is transmitted in a non-HT duplication format of 20 MHz unit.

Referring to FIG. 42, the HARQ-SIG-B may be duplicated in the same structure as the HE-SIG-B defined in 11ax.

In this case, since the STA considers only a primary channel to decode the HARQ-SIG-B, decoding overhead may be reduced but signaling overhead of the HARQ-SIG-B is increased.

Figure 43:
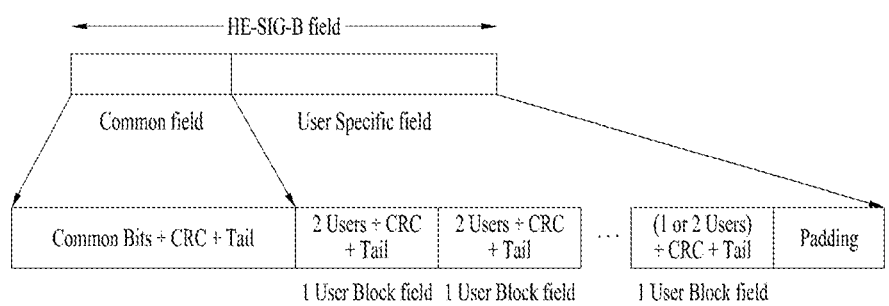
FIG. 43 illustrates HE-SIG-B field defined in 11ax.

FIG. 43 illustrates HE-SIG-B field defined in 11ax.

Referring to FIG. 43, the SIG-B field may be categorized into a common field and a user-specific field. The common field may include common bits and CRC and tail. The user-specific field may be categorized into several user blocks and padding. Each user block may include 2 user bits and CRC and tail except the last block. The last user block may include 1 or 2 user bits and CRC and tail.

Figure 44:
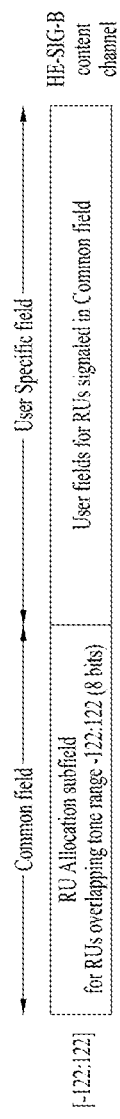
FIG. 44 illustrates HE-SIG-B content channel of 20 MHz PPDU.

FIG. 44 illustrates HE-SIG-B content channel of 20 MHz PPDU.

Referring to FIG. 44, RU Allocation sub field indicates information on RUs corresponding to a given tone range (e.g., [−122:122]), and the user-specific field includes User field for RUs.

Figure 45:
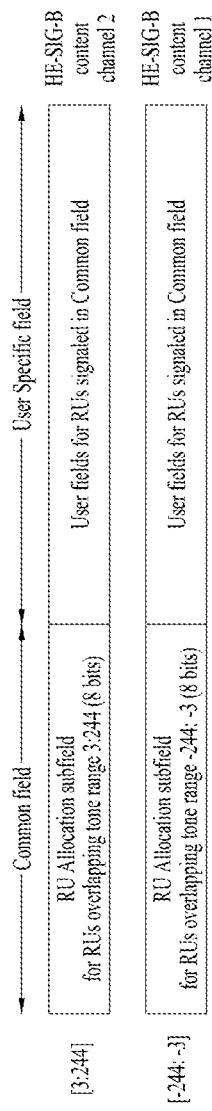
FIG. 45 illustrates HE-SIG-B content channel of 40 MHz PPDU.

FIG. 45 illustrates HE-SIG-B content channel of 40 MHz PPDU. HE-SIG-B content channel structure of 40 MHz PPDU shown in FIG. 45 may be applied to HARQ-SIG-B content channel of 40 MHz PPDU.

Figure 46:
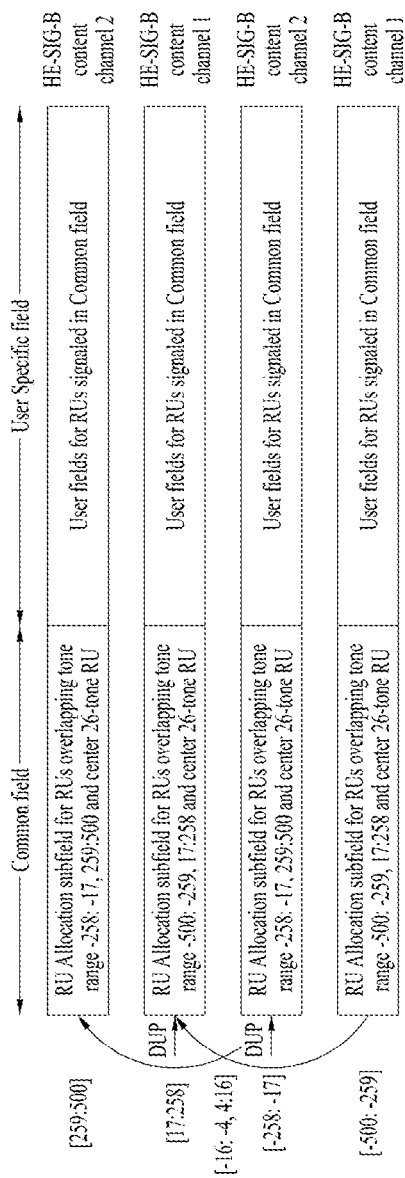
FIG. 46 illustrates HE-SIG-B content channel of 80 MHz PPDU.

FIG. 46 illustrates HE-SIG-B content channel of 80 MHz PPDU. HE-SIG-B content channel structure of 80 MHz PPDU shown in FIG. 46 may be applied to HARQ-SIG-B content channel of 80 MHz PPDU. First and third 20 MHz contents are duplicated, and second and fourth 20 MHz contents are duplicated. Each 20 MHz content includes information of RU and user fields for corresponding 20 MHz channels.

Figure 47:
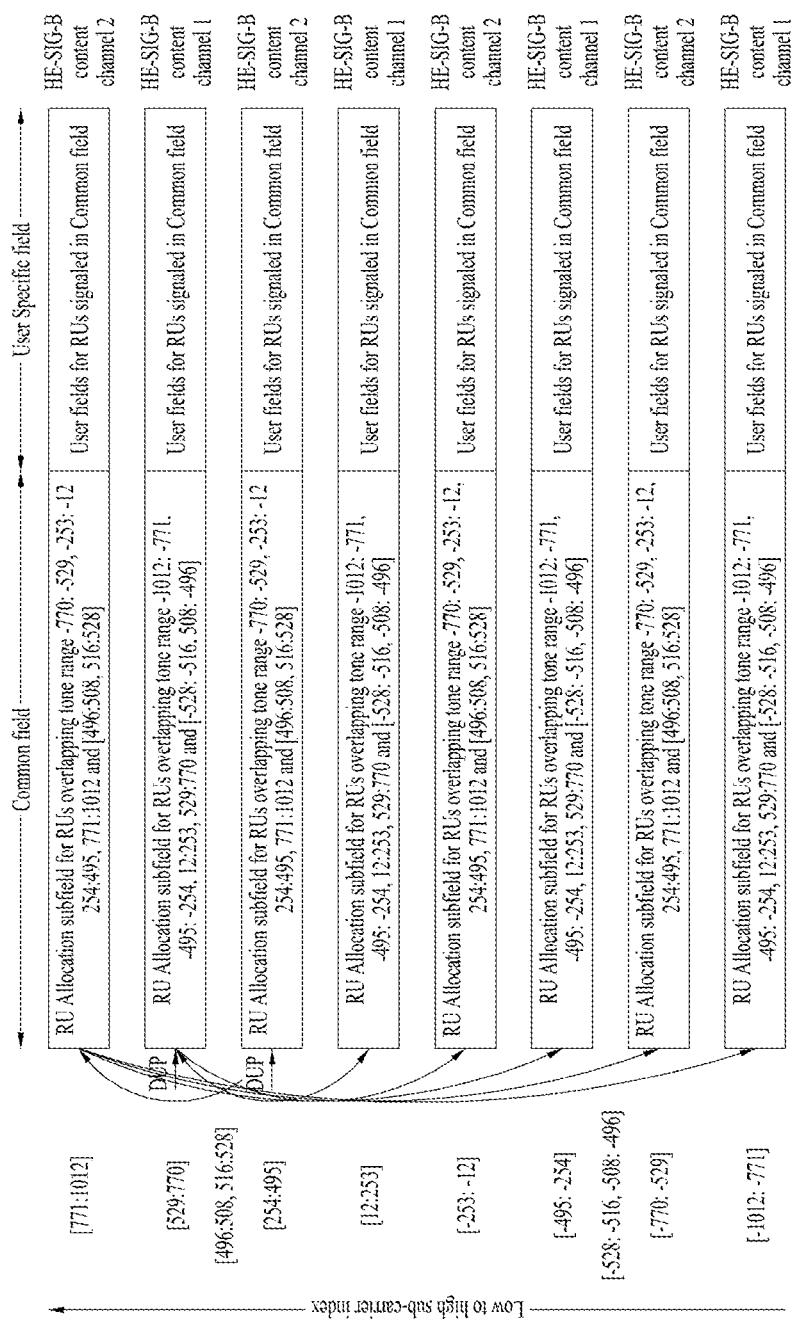
FIG. 47 illustrates HE-SIG-B content channel of 160 MHz PPDU.

FIG. 47 illustrates HE-SIG-B content channel of 160 MHz PPDU. HE-SIG-B content channel structure of 160 MHz PPDU shown in FIG. 46 may be applied to HARQ-SIG-B content channel of 160 MHz PPDU. First, third, fifth and seventh 20 MHz contents are duplicated, and second, fourth, sixth and eighth 20 MHz contents are duplicated. Each 20 MHz content includes information of RU and user fields for corresponding 20 MHz channels.

Figure 48:
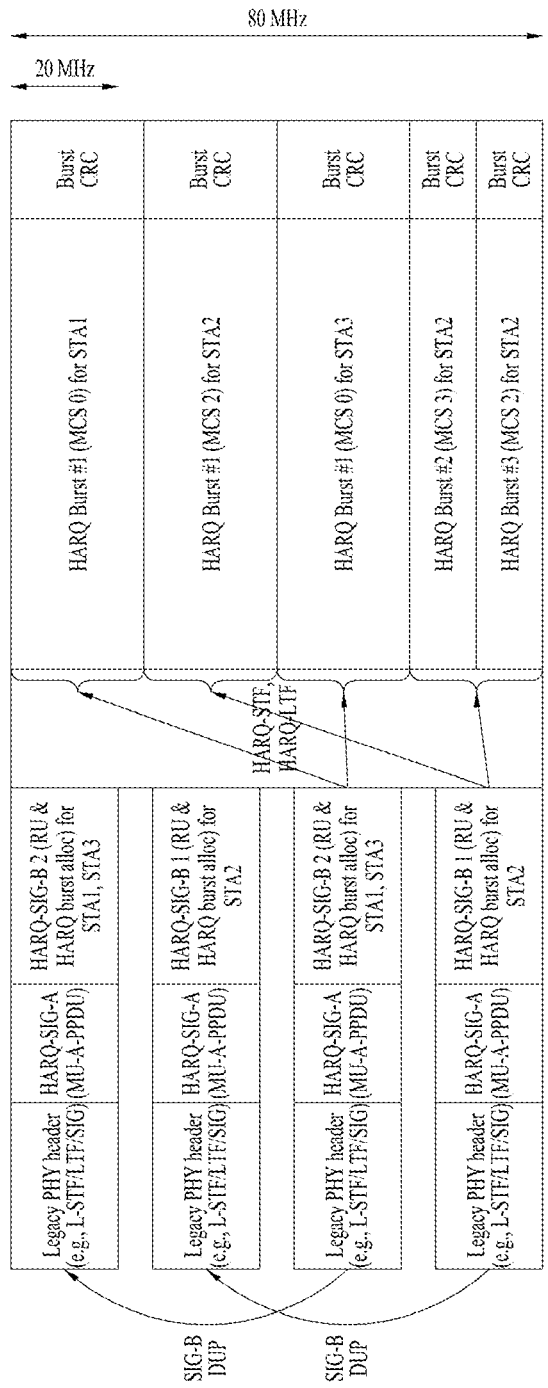
FIG. 48 illustrates another example of HARQ-SIG B configured like HE-SIG-B defined in 1ax.

FIG. 48 illustrates another example of HARQ-SIG B configured like HE-SIG-B defined in lax.

Referring to FIG. 48, first and third 20 MHz HE-SIG-B contents are duplicated, and therefore include resource and HARQ Burst allocation information of STA2. Second and fourth 20 MHz HE-SIG-B Contents are duplicated and therefore include resource allocation and HARQ Burst allocation information of STA1 and STA3.

If SIG-B structure (e.g., 1, 2, 1, 2, . . . , 1,2) defined in 11ax is used, signaling overhead may be reduced as compared with the case that HARQ-SIG B is transmitted by non-HT duplication. Also, one or more RUs(resource units) may be allocated to one STA, a different HARQ Burst may be transmitted to each RU, and a different MCS may be applied to each HARQ Burst. For example, a different MCS may be used depending on a state of each sub channel or new transmission/retransmission. MCS of HARQ Burst transmitted to RU having a good channel state may be higher than MCS of HARQ Burst transmitted to RU having a poor channel state.

If the HARQ-SIG-B is transmitted at a full bandwidth, overhead of SIG-B may be reduced. If the HARQ-SIG-B is transmitted by Non-HT Duplication format, contents of the HARQ-SIG-B are repeatedly transmitted, whereby overhead and HARQ-SIG-B length are increased. However, since the STA has only to sufficiently monitor 20 MHz channel to receive the HARQ-SIG-B, STA implementation complexity may be reduced. If the STA monitors the full bandwidth, the STA may enhance reception performance of the HE-SIG-B through the HARQ-SIG-B duplicated in each channel.

In the same manner as the HE-SIG-B structure defined in 11ax, HARQ-SIG-B contents transmitted from odd numbered channels may be transmitted by duplication, and HE-SIG-B contents transmitted from even numbered channels may also be transmitted by duplication. This may disperse overhead and reduce complexity of the STA.

The aforementioned manners may be used by combination.

Figure 49:
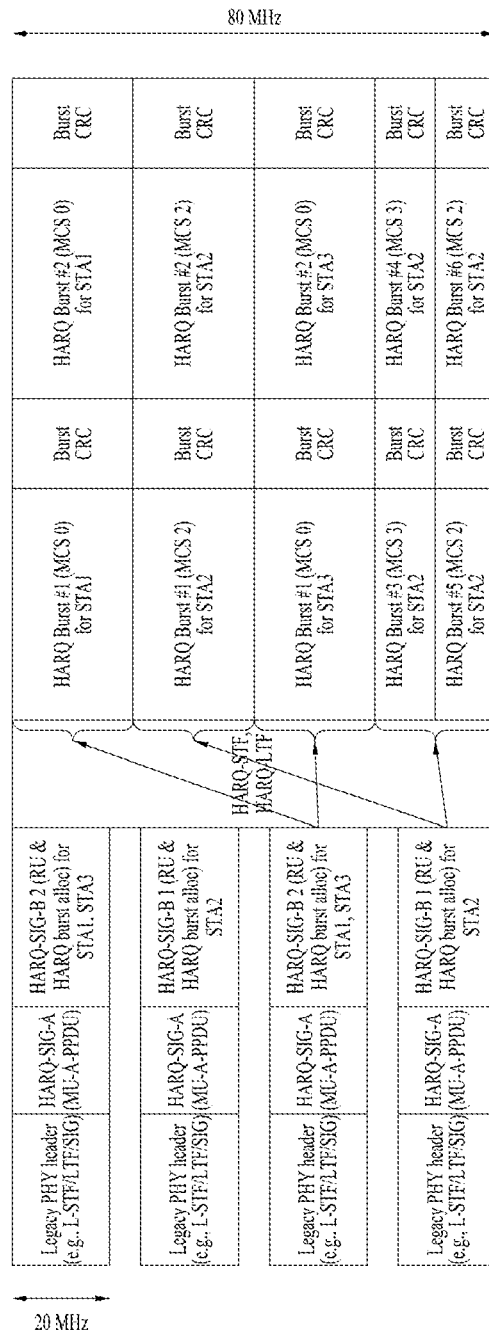
FIG. 49 illustrates an example of HARQ-SIG B transmitted in the same manner as HE-SIG-B of 11ax.

FIG. 49 illustrates an example of HARQ-SIG B transmitted in the same manner as HE-SIG-B of 11ax.

Referring to FIG. 49, HARQ Burst #1 and #2 transmitted to STA1 and STA3 are transmitted by being divided in a time domain, and HARQ Bursts transmitted to STA2 are transmitted by being divided into time/frequency domains. This manner improves flexibility.

Figure 50:
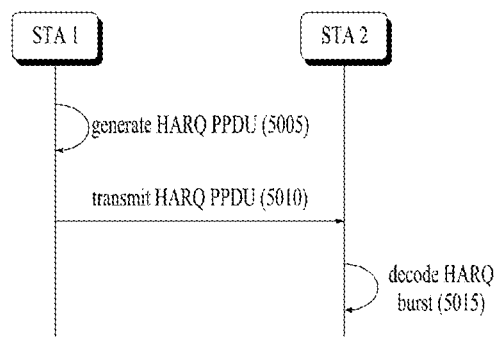
FIG. 50 illustrates a flow of a method for transmitting or receiving HARQ PPDU according to one embodiment of the present disclosure.

FIG. 50 illustrates a flow of a method for transmitting or receiving HARQ PPDU according to one embodiment of the present disclosure. It is assumed that STA 1 of FIG. 50 is a transmission STA and STA 2 is a reception STA. STA 1/2 may be non-AP STA or may operate as AP STA.

Referring to FIG. 50, the STA 1 may generate HARQ PPDU that includes allocation information on HARQ burst which is unit data to which HARQ process is applied and multiple HARQ bursts (5005).

The STA 1 may transmit the HARQ PPDU (5010). The STA 2 receives the HARQ PPDU.

The STA 2 may perform decoding for at least one of multiple HARQ bursts based on allocation information on HARQ burst (5015).

The HARQ PPDU may include HARQ signaling (SIG) field of a physical layer for transmitting allocation information on HARQ burst.

The allocation information on HARQ burst may include STA ID for each HARQ burst, HARQ burst size information, HARQ process channel ID and information indicating, in a toggle manner, whether corresponding information is new transmission or retransmission.

The HARQ PPDU is MU(multi-user) format, the multiple HARQ bursts may be provided to multiple STAs in a frequency domain through multiple channels, and MCS (modulation and coding scheme) may independently be configured per HARQ burst.

The HARQ SIG field for transmitting allocation information on HARQ burst may be transmitted individually for each of the multiple channels or may be transmitted to all of the multiple channels as one field.

The allocation information for HARQ burst may be categorized into first type information for HARQ bursts transmitted from odd numbered channels of the multiple channels and second type information for HARQ bursts transmitted from even numbered channels.

The first type information may be repeated in the odd numbered channels, and the second type information may be repeated in the even numbered channels.

The HARQ PPDU is SU(single user) format, the multiple HARQ bursts may be multiplexed in a time domain, and HARQ SIG field may independently be provided for each HARQ burst.

Each HARQ SIG field may include HARQ sequence indicating that a current field is HARQ SIG field and information indicating whether a current HARQ burst is the last HARQ burst.

Figure 51:
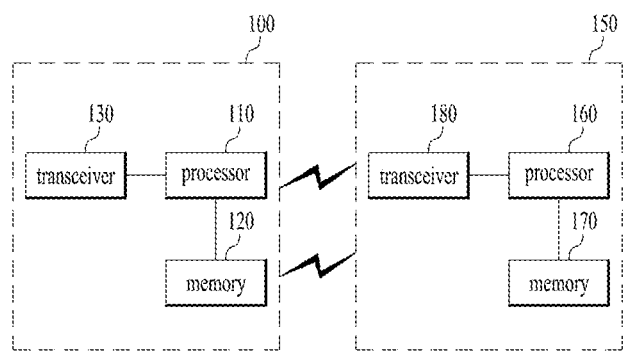
FIG. 51 is an explanatory diagram of an apparatus according to an embodiment of the present invention.

FIG. 51 is an explanatory diagram of a device for implementing the above-described method.

A wireless apparatus 800 of FIG. 51 may correspond to the above-described specific STA and a wireless apparatus 850 of FIG. 51 may correspond to the above-described AP.

The STA 800 may include a processor 810, a memory 820, and a transceiver 830, and the AP 850 may include a processor 860, a memory 870, and a transceiver 880. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the exemplary embodiments of the present disclosure has been given to enable those skilled in the art to implement and practice the invention. Although the invention has been described with reference to the preferred embodiments, those skilled in the art will appreciate that various modifications and variations can be made in the present disclosure without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present disclosure may be applied to various wireless communication systems including an IEEE 802.11 system.

The invention claimed is:

1. A method for transmitting a hybrid automatic repeat request (HARQ) physical protocol data unit (PPDU) by a station (STA) in a wireless local area network (WL AN) supporting HARQ process, the method comprising:
generating a HARQ PPDU including allocation information for HARQ burst, which is unit data to which the HARQ process is applied, and multiple HARQ bursts; and
transmitting the HARQ PPDU,
wherein the HARQ PPDU includes a HARQ signaling (SIG) field of a physical layer,
wherein the allocation information for HARQ burst includes a STA ID for each of the multiple HARQ bursts, HARQ burst size information, HARQ process channel ID, and information indicating, in a toggle manner, whether a transmission is a new transmission or retransmission,
wherein the HARQ SIG field is separated into a first HARQ SIG and a second HARQ SIG,
wherein the first HARQ SIG includes information for full HARQ PPDU transmission,
wherein the second HARQ SIG includes the allocation information for HARQ burst, and
wherein the first HARQ SIG is located before a HARQ-STF (Short Training Field) and a HARQ-LTF (Long Training Field), and wherein the second HARQ SIG is located after the HARQ-STF and a HARQ-LTF.

2. The method of claim 1, wherein, based on the HARQ PPDU having a MU (multi-user) format, the multiple HARQ bursts are provided to multiple STAs in a frequency domain through multiple channels, and a MCS (modulation and coding scheme) is independently configured per HARQ burst.

3. The method of claim 2, wherein the second HARQ SIG for transmitting the allocation information for HARQ burst is transmitted individually for each of the multiple channels or transmitted to all of the multiple channels as one field.

4. The method of claim 2, wherein the allocation information for HARQ burst is categorized into first type information for HARQ bursts transmitted from odd numbered channels of the multiple channels and second type information for HARQ bursts transmitted from even numbered channels, and the first type information is repeated in the odd numbered channels, and the second type information is repeated in the even numbered channels.

5. The method of claim 1, wherein, based on the HARQ PPDU having a SU (single user) format, the multiple HARQ bursts are multiplexed in a time domain, and the HARQ SIG field is independently provided for each HARQ burst.

6. The method of claim 5, wherein each HARQ SIG field includes HARQ sequence indicating that a current field is HARQ SIG field and information indicating whether a current HARQ burst is the last HARQ burst.

7. A method for receiving a hybrid automatic repeat request (HARQ) physical protocol data unit (PPDU) by a station (STA) in a wireless local area network (WLAN) supporting HARQ process, the method comprising:
receiving a HARQ PPDU including allocation information for HARQ burst, which is unit data to which the HARQ process is applied, and multiple HARQ bursts; and
performing decoding for at least one of the multiple HARQ bursts based on the allocation information for HARQ burst,
wherein the HARQ PPDU includes a HARQ signaling (SIG) field of a physical layer,
wherein the allocation information for HARQ burst includes a STA ID for each of the multiple HARQ bursts, HARQ burst size information, HARQ process channel ID, and information indicating, in a toggle manner, whether a transmission is a new transmission or retransmission,
wherein the HARQ SIG field is separated into a firm HARQ SIG and a second HARQ SIG,
wherein the first HARQ SIG includes information for full HARQ PPDU transmission,
wherein the second HARQ SIG includes the allocation information for HARQ burst, and
wherein the first HARQ SIG is located before a HARQ-STF (Short Training Field) and a HARQ-LTF (Long Training Field), and wherein the second HARQ SIG is located after the HARQ-STF and a HARQ-LTF.

8. The method of claim 7, wherein, based on the HARQ PPDU having a MU (multi-user) format, the multiple HARQ bursts are provided to multiple STAs in a frequency domain through multiple channels, and a MCS (modulation and coding scheme) is independently configured per HARQ burst.

9. The method of claim 8, wherein the HARQ SIG field for transmitting the allocation information for HARQ burst is received individually for each of the multiple channels or received to all of the multiple channels as one field.

10. The method of claim 8, wherein the allocation information for HARQ burst is categorized into first type information for HARQ bursts transmitted from odd numbered channels of the multiple channels and second type information for HARQ bursts transmitted from even numbered channels, and the first type information is repeated in the odd numbered channels, and the second type information is repeated in the even numbered channels.

11. The method of claim 7, wherein, based on the HARQ PPDU having a SU (single user) format, the multiple HARQ bursts are multiplexed in a time domain, and HARQ SIG field is independently provided for each HARQ burst.

12. The method of claim 11, wherein each HARQ SIG field includes HARQ sequence indicating that a current field is HARQ SIG field and information indicating whether a current HARQ burst is the last HARQ burst.

13. A station (STA) for transmitting a hybrid automatic repeat request (HARQ) physical protocol data unit (PPDU)

in a wireless local area network (WLAN) supporting HARQ process, the station (STA) comprising:
a transmitter;
at least one processors; and
at least one computer-readable memory storing instructions that, based on being executed by the at least one processor, control the STA to perform operations comprising:
generating a HARQ PPDU including allocation information for HARQ burst, which is unit data to which the HARQ process is applied, and multiple HARQ bursts; and
transmit through the transmitter, transmitting the HARQ PPDU,
wherein the HARQ PPDU includes a HARQ signaling (SIG) field of a physical layer,
wherein the allocation information for HARQ burst includes a STA ID for each of the multiple HARQ bursts, HARQ burst size information, HARQ process channel ID, and information indicating, in a toggle manner, whether a transmission is a new transmission or retransmission,
wherein the HARQ SIG field is separated into a first HARQ SIG and a second HARQ SIG,
wherein the first HARQ includes information for full HARQ PPDU transmission,
wherein the second HARQ SIG includes the allocation information for HARQ burst, and
wherein the first HARQ SIG is located before a HARQ-STF (Short Training Field) and a HARQ-LTF (Long Training Field), and wherein the second HARQ SIG is located after the HARQ-STF and a HARQ-LTF.

14. A station (STA) for receiving a hybrid automatic repeat request (HARQ) physical protocol data unit (PPDU) in a wireless local area network (WLAN) supporting HARQ process, the station (STA) comprising:
a receiver;
at least one processor; and
at least one computer-readable memory storing instructions that, based on being executed by the at least one processor, control the STA to perform operations comprising:
receiving, through the receiver, a HARQ PPDU including allocation information for HARQ burst, which is unit data to which the HARQ process is applied, and multiple HARQ bursts; and
performing decoding for at least one of the multiple HARQ bursts based on the allocation information for HARQ burst,
wherein the HARQ PPDU includes a HARQ signaling (SIG) field of a physical layer,
wherein the allocation information for HARQ burst includes a STA ID for each of the multiple HARQ bursts, HARQ burst size information, HARQ process channel ID, and information indicating; in a toggle manner, whether a transmission is a new transmission or retransmission,
wherein the HARQ SIG field is separated into a first HARQ SIG and a second HARQ SIG,
wherein the first HARQ SIG includes information for full HARQ PPDU transmission,
wherein the second HARQ SIG includes the allocation information for HARQ burst, and
wherein the first HARQ SIG is located before a HARQ-STF (Short Training Field) and a HARQ-LTF (Long Training Field) and wherein the second HARQ SIG is located after the HARQ-STF and a HARQ-LTF.

* * * * *